US012609119B2

(12) United States Patent
Lee et al.

(10) Patent No.: US 12,609,119 B2
(45) Date of Patent: Apr. 21, 2026

(54) METHOD AND APPARATUS FOR PROVIDING VIRTUAL SPACE IN WHICH INTERACTION WITH ANOTHER ENTITY IS APPLIED TO ENTITY

(71) Applicant: Samsung Electronics Co., Ltd., Suwon-si (KR)

(72) Inventors: Jongwon Lee, Suwon-si (KR); Hanbeen Kim, Suwon-si (KR); Soonsang Park, Suwon-si (KR); Miyeoung Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 274 days.

(21) Appl. No.: 18/475,580

(22) Filed: Sep. 27, 2023

(65) Prior Publication Data

US 2024/0105173 A1     Mar. 28, 2024

Related U.S. Application Data

(63) Continuation of application No. PCT/KR2023/010908, filed on Jul. 27, 2023.

(30) Foreign Application Priority Data

Sep. 22, 2022   (KR) ........................ 10-2022-0119890
Nov. 29, 2022   (KR) ........................ 10-2022-0162577

(51) Int. Cl.
*G10L 15/22*          (2006.01)
*G06T 19/00*          (2011.01)
                 (Continued)

(52) U.S. Cl.
CPC ............ *G10L 15/22* (2013.01); *G06T 19/006* (2013.01); *G06V 20/50* (2022.01);
                 (Continued)

(58) Field of Classification Search
USPC ......................... 704/231, 235, 246, 247, 275
See application file for complete search history.

(56) References Cited

U.S. PATENT DOCUMENTS 8,965,460 B1 *   2/2015   Rao .................. H04N 21/41407
                                                455/566
10,176,641 B2    1/2019   Lindsay et al.
                 (Continued)

FOREIGN PATENT DOCUMENTS

KR      10-2003-0011162 A      2/2003
KR      10-2015-0106772 A      9/2015
                 (Continued)

OTHER PUBLICATIONS

International Search Report dated Oct. 25, 2023 in PCT/KR2023/010908 and English-language translation.

*Primary Examiner* — Leonard Saint-Cyr
(74) *Attorney, Agent, or Firm* — Nixon & Vanderhye, P.C.

(57)                    ABSTRACT

An example electronic device may include a memory storing computer-executable instructions and a processor configured to execute the instructions by accessing the memory. The instructions may cause the processor to control the electronic device receive a voice input for requesting to apply an interaction with a second entity to a first entity; obtain a graphic representation corresponding to the second entity based on the received voice input; display the obtained graphic representation on a screen area corresponding to the first entity on a display of the electronic device; and based on receiving a control input for the second entity, transmit, to an external device corresponding to the first entity, a control command, converted from the control input, for triggering an operation of the external device.

15 Claims, 19 Drawing Sheets

(51) Int. Cl.
  *G06V 20/50* (2022.01)
  *G10L 15/18* (2013.01)
  *G10L 15/30* (2013.01)

(52) U.S. Cl.
  CPC .......... *G10L 15/1815* (2013.01); *G10L 15/30*
    (2013.01); *G10L 2015/223* (2013.01); *G10L*
    *2015/225* (2013.01)

(56) References Cited

U.S. PATENT DOCUMENTS

| | | | |
|---|---|---|---|
| 10,242,502 B2 | 3/2019 | Dange | |
| 10,366,538 B2 | 7/2019 | Meier et al. | |
| 10,593,114 B2 | 3/2020 | Yamauchi et al. | |
| 10,602,046 B2 | 3/2020 | Pan | |
| 10,921,896 B2 | 2/2021 | Lopez et al. | |
| 11,132,840 B2 | 9/2021 | Sarangdhar et al. | |
| 2021/0201392 A1* | 7/2021 | Aghdaii | H04L 51/046 |
| 2022/0157029 A1 | 5/2022 | Horita et al. | |
| 2023/0067305 A1* | 3/2023 | Assa | G06F 3/167 |
| 2023/0197064 A1* | 6/2023 | Bekker | G06N 3/08 |
| | | | 704/200 |

FOREIGN PATENT DOCUMENTS

| | | | |
|---|---|---|---|
| KR | 10-2017-0125618 A | 11/2017 | |
| KR | 10-2021-0015589 A | 2/2021 | |
| WO | 2021/215547 A1 | 10/2021 | |

* cited by examiner

500

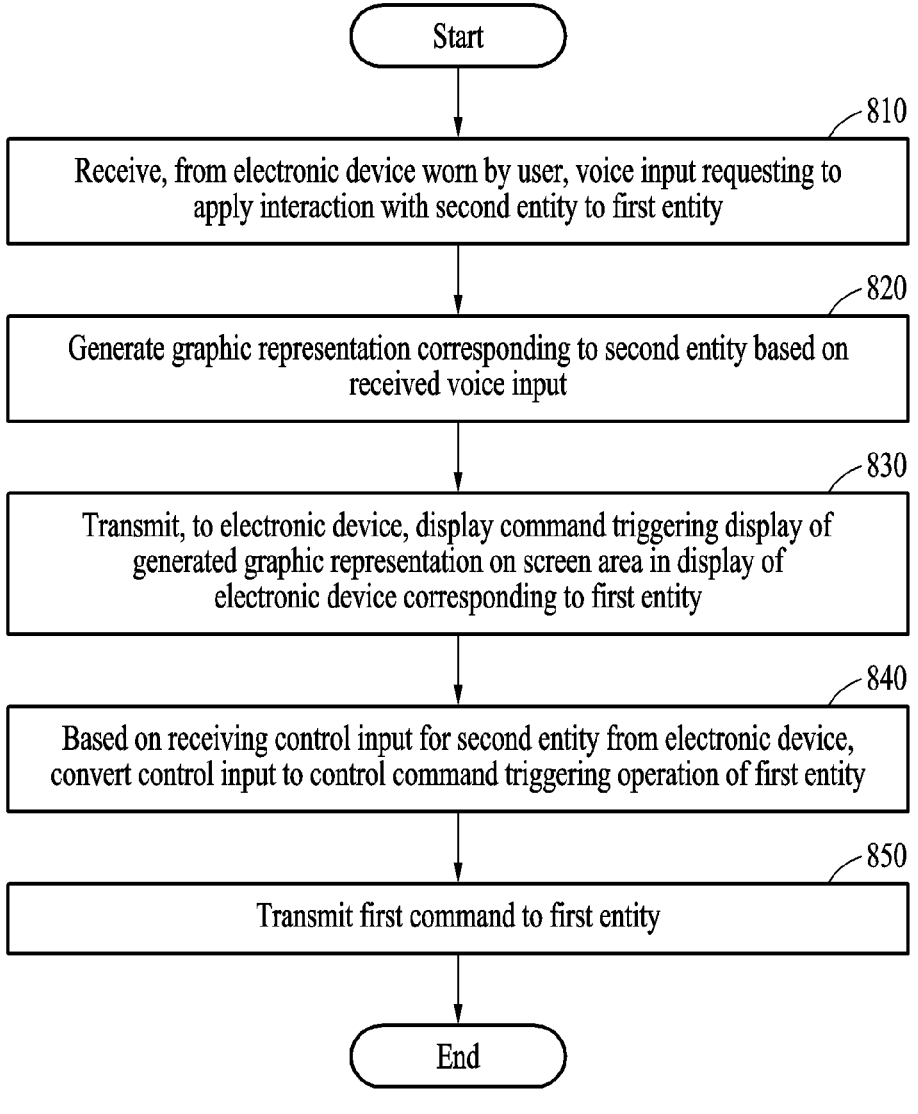

Start

810

Receive, from electronic device worn by user, voice input requesting to apply interaction with second entity to first entity

820

Generate graphic representation corresponding to second entity based on received voice input

830

Transmit, to electronic device, display command triggering display of generated graphic representation on screen area in display of electronic device corresponding to first entity

840

Based on receiving control input for second entity from electronic device, convert control input to control command triggering operation of first entity

850

Transmit first command to first entity

End

METHOD AND APPARATUS FOR PROVIDING VIRTUAL SPACE IN WHICH INTERACTION WITH ANOTHER ENTITY IS APPLIED TO ENTITY

CROSS-REFERENCE TO RELATED APPLICATIONS

This application is a continuation of International Application No. PCT/KR2023/010908 designating the United States, filed on Jul. 27, 2023, in the Korean Intellectual Property Receiving Office and claiming priority to Korean Patent Application No. 10-2022-0119890 filed on Sep. 22, 2022, in the Korean Intellectual Property Office, and to Korean Patent Application No. 10-2022-0162577 filed on Nov. 29, 2022, in the Korean Intellectual Property Office, the disclosures of all of which are incorporated by reference herein in their entireties.

BACKGROUND

1. Field

The disclosure relates to a technology for constructing a virtual space and, more particularly, to a technology for providing a virtual space in which an interaction with another entity is applied to an entity.

2. Description of Related Art

Recently, computer graphics-applied virtual reality (VR), augmented reality (AR), and mixed reality (MR) technologies are in development. VR technology may, for example, construct a virtual space that does not exist in a real world using a computer and provide users with the virtual space to allow them to perceive it as real. AR or MR technology may add information generated by a computer into the real world to express it, that is, combine the real world and the virtual world to allow users to interact therein in real time.

Among these, AR and MR technologies are used in conjunction with other technologies in various fields, for example, broadcasting, medicine, gaming, and the like. Representative examples of such applications of AR technology may include, for example, a case in which a weather map in front of a weather forecaster who gives a weather forecast on a television (TV) changes naturally or a case in which an advertisement image that is not actually present in a sports stadium is inserted in and transmitted onto the screen as if it is actually present in the stadium during sports broadcasting.

A metaverse is a representative service that provides AR and MR to users. The metaverse, a compound word of "meta" which means processing and abstraction and "universe" which means the real world, may refer to a three-dimensional (3D) virtual world. The metaverse, a concept that is further advanced than the term indicating an existing VR environment, may provide an AR environment in which a virtual world on the web or the internet is absorbed into the real world.

In a metaverse space, virtual objects may be arranged based on physical objects present in a physical space of the real world. A user may interact with a physical object through a virtual object arranged in the metaverse space. For example, a graphic object corresponding to a virtual object arranged in the physical space may be displayed, and in response to a user input detected from the virtual object, an operation may be performed on at least one of the virtual object or the physical object.

SUMMARY

According to an example embodiment, an electronic device may include a memory storing computer-executable instructions and a processor configured to execute the instructions by accessing the memory. The instructions may be configured to receive a voice input that requests to apply an interaction with a second entity to a first entity; obtain a graphic representation corresponding to the second entity based on the received voice input; display the generated graphic representation on a screen area corresponding to the first entity in a display of the electronic device; and, based on receiving a control input for the second entity, transmit, to an external device corresponding to the first entity, a control command that triggers an operation of the external device converted from the control input for the second entity.

According to an example embodiment, a method performed by a server may include receiving a voice input that requests to apply an interaction with a second entity to a first entity; obtaining a graphic representation corresponding to the second entity based on the received voice input; displaying the generated graphic representation on a screen area corresponding to the first entity in a display of the electronic device; and, based on receiving a control input for the second entity, transmitting, to an external device corresponding to the first entity, a control command that triggers an operation of the external device converted from the control input.

BRIEF DESCRIPTION OF THE DRAWINGS

The above and/or other aspects of the disclosure will be more apparent by describing certain embodiments of the disclosure with reference to the accompanying drawings, in which:

FIG. 8 is a diagram illustrating an example method in which a server applies an interaction with a second entity to a first entity and displays and controls it according to various embodiments;

DETAILED DESCRIPTION

Figure 1:
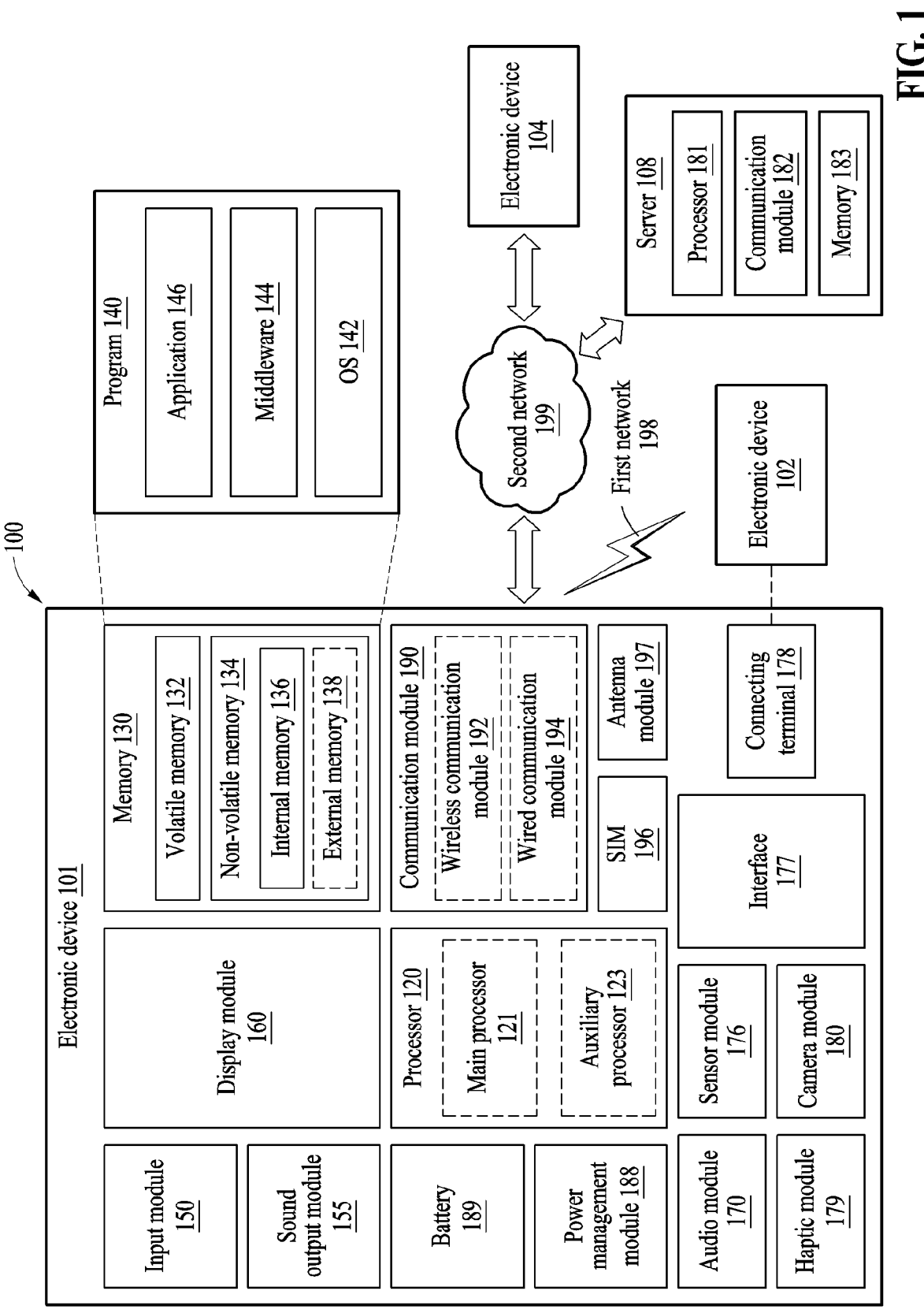
FIG. 1 is a block diagram illustrating an example electronic device in a network environment according to various embodiments.

Hereinafter, various example embodiments will be described in greater detail with reference to the accompanying drawings. When describing the embodiments with reference to the accompanying drawings, like reference numerals refer to like elements and a repeated description related thereto may not be provided.

FIG. 1 is a block diagram illustrating an example electronic device in a network environment according to various embodiments.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the above components may be omitted from the electronic device 101, or one or more other components may be added to the electronic device 101. In various embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computations. According to an example embodiment, as at least a part of data processing or computations, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specifically for artificial intelligence (AI) model processing. An AI model may be generated by machine learning. The machine learning may be performed by, for example, the electronic device 101, in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and control circuitry for controlling a corresponding one of the display, the hologram device, and the projector. According to an example embodiment, the display module 160 may include a touch sensor adapted to sense a touch, or a pressure sensor adapted to measure an intensity of a force of the touch.

The audio module 170 may convert sound into an electric signal or vice versa. According to an example embodiment, the audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with an external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). According to an example embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, and flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an antenna array, analog beamforming, or a large-scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC on a first surface (e.g., a bottom surface) of the PCB, or adjacent to the first surface of the PCB and capable of supporting a designated high-frequency band (e.g., a mmWave band), and a plurality of antennas (e.g., an antenna array) disposed on a second surface (e.g., a top or a side surface) of the PCB, or adjacent to the second surface of the PCB and capable of transmitting or receiving signals in the designated high-frequency band.

At least some of the above-described components may be coupled mutually and exchange signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device (e.g., the electronic device 104) via the server 108 coupled with the second network 199.

Each of the external electronic devices (e.g., the electronic device 102 and 104) may be a device of the same type as or a different type from the electronic device 101. According to an example embodiment, some or all the operations to be executed by the electronic device 101 may be executed by one or more of the external electronic devices (e.g., the electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least a part of the function or service. The one or more external electronic devices receiving the request may perform the at least part of the function or service requested, or an additional function or an additional service related to the request, and may transfer a result of the performance to the electronic device 101. The electronic device 101 may provide the result, with or without further processing of the result, as at least a part of a response to the request. In this disclosure, an example in which the electronic device 101 is an augmented reality (AR) device (e.g., an electronic device 201 of FIG. 2, an electronic device 301 of FIG. 3, or an electronic device 401 of FIGS. 4A and 4B), and the server 108 among the external electronic devices (e.g., 102, 103, and 108) transmits, to the electronic device 101, a result of executing a virtual space and an additional function or service associated with the virtual space will be mainly described herein.

The server 108 may include a processor 181, a communication module 182, and a memory 183. The processor 181, the communication module 182, and the memory 183 may be configured similarly to the processor 120, the communication module 190, and the memory 130 of the electronic device 101. For example, the processor 181 may execute instructions stored in the memory 183 to provide a virtual space and interactions with users in the virtual space. The processor 181 may generate at least one of visual information, auditory information, or tactile information of the virtual space and objects in the virtual space. For example, as the visual information, the processor 181 may generate rendering data (e.g., visual rendering data) obtained by rendering an appearance (e.g., shape, size, color, or texture) of the virtual space and an appearance (e.g., shape, size, color, or texture) of an object in the virtual space. The processor 181 may also generate rendering data obtained by rendering interactions between objects (e.g., physical objects, virtual objects, or avatar objects) in the virtual space or changes (e.g., a change in an appearance of an object, an emission of a sound, or a tactile event) that occur based on at least one of a user input to an object (e.g., a physical object, a virtual object, or an avatar object). The communication module 182 may establish communication with a first electronic device (e.g., the electronic device 101) of a user and a second electronic device (e.g., the electronic device 102) of another user. The communication module 182 may transmit at least one of the visual information, the auditory information, or the tactile information described above to the first electronic device and the second electronic device. For example, the communication module 182 may transmit the rendering data.

For example, the server 108 may render contents data executed in an application and transmit the rendered contents data to the electronic device 101, and the electronic device 101 receiving the contents data may output the contents data to the display module 160. For example, when the electronic device 101 detects a movement of a user via an IMU sensor or the like, the processor 120 of the electronic device 101 may correct the rendering data received from the server 108 based on such movement information and output it to the display module 160. Alternatively, the electronic device 101 may transmit the movement information to the server 108 to request rendering such that screen data is updated accordingly. However, the example embodiments are not limited thereto, and the rendering may be performed by various types of external electronic devices (e.g., 102 and 103) such as a smartphone or a case device that stores and charges the electronic device 101. For example, rendering data corresponding to a virtual space generated by the external electronic devices 102 and 103 may be provided to the electronic device 101. For an example embodiment, the electronic device 101 may receive virtual space information (e.g., vertex coordinates, texture, and color defining the virtual space) and object information (e.g., vertex coordinates, texture, and color defining an appearance of an object) from the server 108 and perform itself the rendering based on the received data.

Figure 2:
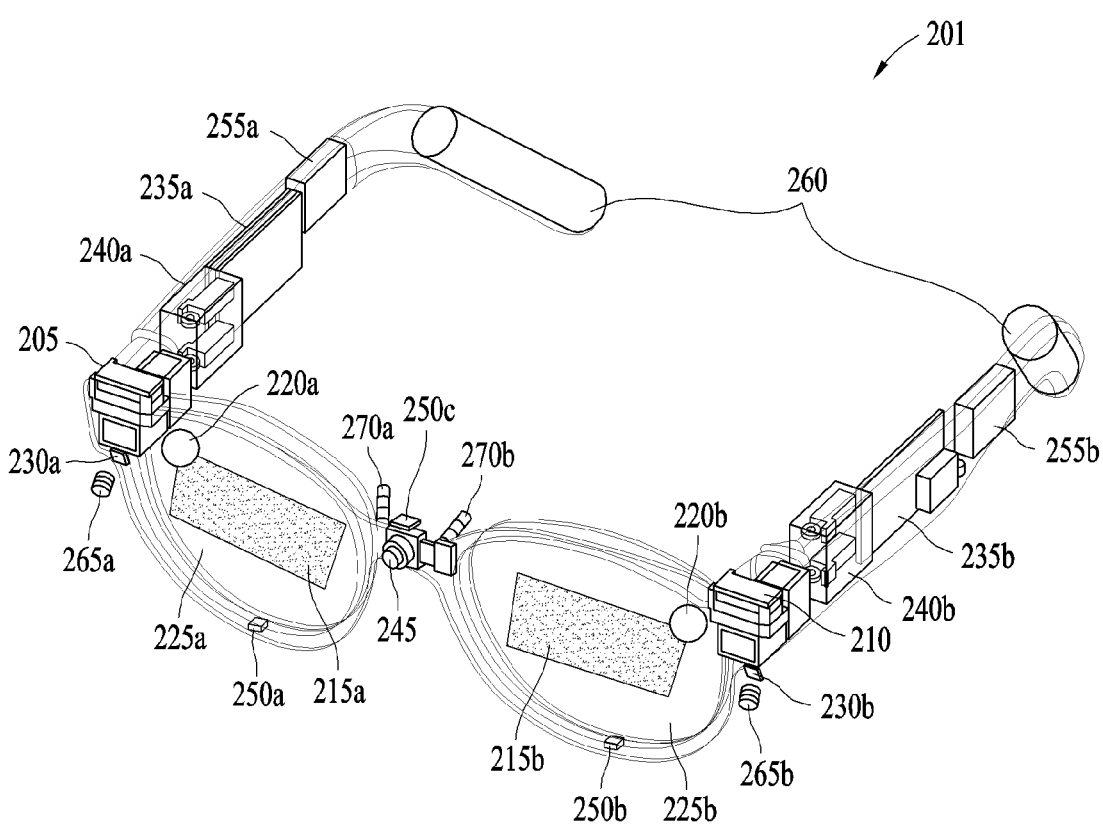
FIG. 2 is a diagram illustrating an example optical see-through (OST) device according to various embodiments.

FIG. 2 is a diagram illustrating an example optical see-through (OST) device according to various embodiments.

An electronic device 201 may include at least one of a display (e.g., the display module 160 of FIG. 1), a vision sensor, a light source (e.g., light sources 230a and 230b), an optical element, or a substrate. The electronic device 201 that has a transparent display and provides an image through the transparent display may, for example, be referred to herein as an OST device.

The display may include, for example, a liquid crystal display (LCD), a digital mirror device (DMD), a liquid crystal on silicon (LCoS), an organic light-emitting diode (OLED), a micro light-emitting diode (micro-LED), and the like. Although not shown, for example, when the display is one of an LCD, a DMD, and an LCoS, the electronic device 201 may include a light source (e.g., the light sources 230a and 230b) configured to emit light to a screen output area (e.g., screen display portions 215a and 215b) of the display. For another example, when the display is adapted to generate light by itself, for example, when the display is either an OLED or a micro-LED, the electronic device 201 may provide a virtual image with a relatively high quality to a user even though a separate light source (e.g., the light sources 230a and 230b) is not included. For example, when the display is implemented as an OLED or a micro-LED, the light source (e.g., the light sources 230a and 230b) may be unnecessary, and thus the electronic device 201 may become lighter in weight.

Referring to FIG. 2, the electronic device 201 may include the display, a first transparent member 225a, and/or a second transparent member 225b, and the user may use the electronic device 201 with the electronic device 201 worn on a face of the user. The first transparent member 225a and/or the second transparent member 225b may be formed of, for example, a glass plate, a plastic plate, or a polymer, and may be transparently or translucently formed. According to an example embodiment, the first transparent member 225a may be arranged to face a right eye of the user, and the second transparent member 225b may be arranged to face a left eye of the user. The display may include a first display 205 configured to output a first image (e.g., a right image) corresponding to the first transparent member 225a, and a second display 210 configured to output a second image (e.g., a left image) corresponding to the second transparent member 225b. For example, when each display is transparent, each display and a corresponding transparent member may be arranged at a position corresponding to an eye of the user to form a screen display portion (e.g., the screen display portions 215a and 215b).

In an example embodiment, a light path of light emitted from the display (e.g., the first display 205 and the second display 210) may be guided by a waveguide through an input optical member (e.g., input optical members 220a and 220b). The light traveling in the waveguide may be guided toward the eyes of the user through an output optical member (e.g., an output optical member 340 of FIG. 3). The screen display portions 215a and 215b may be determined based on the light emitted toward the eyes.

For example, light emitted from the display (e.g., the first display 205 and the second display 210) may be reflected from a grating area of the waveguide formed on the input optical members 220a and 220b and the screen display portions 215a and 215b and may thereby be transmitted to the eyes of the user.

The optical element may include at least one of a lens or an optical waveguide.

The lens may adjust a focus such that a screen output to the display may be visible to the eyes of the user. The lens may include, for example, at least one of a Fresnel lens, a pancake lens, or a multi-channel lens.

The optical waveguide may transfer image rays generated from the display to the eyes of the user. For example, an image ray may refer to a ray of light that has passed through the screen output area of the display after being emitted by the light source (e.g., the light sources 230a and 230b). The optical waveguide may be formed of glass, plastic, or polymer. The optical waveguide may include a nanopattern formed on an inner or outer surface of the optical waveguide, for example, a polygonal or curved grating structure. An example structure of the optical waveguide will be described in detail below with reference to FIG. 3.

The vision sensor may include at least one of a camera sensor and a depth sensor.

A first camera (e.g., first cameras 265a and 265b), which is a camera for recognition, may be a camera used for three degrees of freedom (3DoF) and six degrees of freedom (6DoF) head tracking, hand detection and tracking, and spatial recognition. For example, the first camera (e.g., the first cameras 265a and 265b) may mainly include a global shutter (GS) camera. In this case, the first camera (e.g., the first cameras 265a and 265b) may include at least two GS cameras because a stereo camera is required for head tracking and spatial recognition. A GS camera may have a more desirable performance compared to a rolling shutter (RS) camera, in terms of detecting and tracking a fine movement, such as a quick movement of a hand or a finger. For example, a GS camera may have a relatively low image blur. The first camera (e.g., the first cameras 265a and 265b) may capture image data that is used for a simultaneous localization and mapping (SLAM) function for 6DoF spatial recognition and depth imaging. The first camera (e.g., the first cameras 265a and 265b) may also perform a gesture recognition function for recognizing a gesture performed by the user, based on the image data captured by the first camera (e.g., the first cameras 265a and 265b).

A second camera (e.g., second cameras 270a and 270b), which is an eye-tracking (ET) camera, may be used to capture image data used to detect and track the pupils of the user. The second camera (e.g., the second cameras 270a and 270b) will be described in detail below with reference to FIG. 3.

A third camera 245 may be an image-capturing camera. The third camera 245 may include a high-resolution (HR) camera to capture an HR image or a photo video (PV) image. The third camera 245 may include a color camera having functions for obtaining a high-quality image, such as, for example, an automatic focus (AF) function and an optical image stabilizer (OIS). The third camera 245 may be a GS camera or an RS camera.

A fourth camera (e.g., a face recognition camera 430 of FIGS. 4A and 4B), which is a face recognition camera or a face-tracking (FT) camera, may be used to detect and track facial expressions of the user.

A depth sensor (not shown) may be a sensor configured to sense information for determining a distance to an object, such as, for example, time of flight (TOF). TOF may, for example, refer to a technology for measuring a distance to an object using a signal (e.g., a near-infrared ray, ultrasound, laser, etc.). Such a TOF-based depth sensor may, for example, measure a TOF of a signal that is used after a transmitter transmits the signal until a receiver receives the signal.

The light source (e.g., the light sources 230a and 230b) (e.g., an illumination module) may include an element (e.g., an LED) configured to emit light of various wavelengths. The illumination module may be attached at various positions depending on the purpose of use. As an example of use, a first illumination module (e.g., an LED element) may be attached around a frame of an augmented reality (AR) glasses device to emit light for assisting gaze detection when an ET camera tracks a movement of the eyes. The first illumination module may include, for example, an IR LED of an infrared wavelength. As another example of use, a second illumination module (e.g., an LED element) may be attached around a hinge (e.g., hinges 240a and 240b) connecting a frame and a temple or attached in proximity to a camera provided around a bridge connecting the frame. The second illumination module may emit light for supplementing ambient brightness when the camera captures an image. When it is not easy to detect a subject to be captured in a dark environment, the second illumination module may emit light.

The substrate (e.g., substrates 235a and 235b) (e.g., a printed-circuit board (PCB)) may support the components described above.

The PCB may be disposed on the temples of the glasses. For example, a flexible PCB (FPCB) may transmit an electrical signal to each module (e.g., a camera, a display, an audio module, and a sensor module) and another PCB. According to an example embodiment, at least one PCB may be provided in a form including a first board, a second board, and an interposer disposed between the first board and the second board. For another example, the PCB may be disposed at a center of a set. The FPCB may be used to transmit electrical signals to the components and the other boards.

The other components may include, for example, at least one of a plurality of microphones (e.g., a first microphone 250a, a second microphone 250b, and a third microphone 250c), a plurality of speakers (e.g., a first speaker 255a and a second speaker 255b), a battery 260, an antenna, or a sensor (e.g., an acceleration sensor, a gyro sensor, a touch sensor, etc.).

Figure 3:
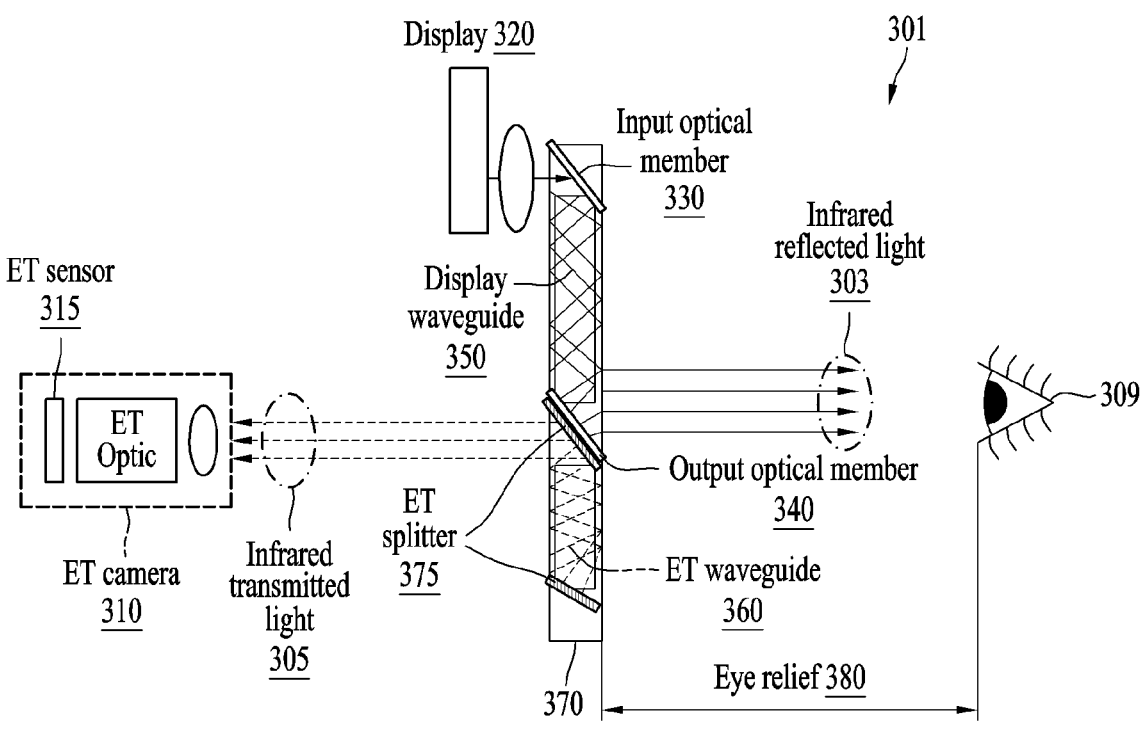
FIG. 3 is a diagram illustrating an example optical system of an eye-tracking (ET) camera, a transparent member, and a display according to various embodiments.

FIG. 3 is a diagram illustrating an example optical system of an ET camera, a transparent member, and a display according to various embodiments.

FIG. 3 illustrates an operation of an ET camera included in an electronic device according to various embodiments. Referring to FIG. 3, an ET camera 310 (e.g., the second cameras 270a and 270b of FIG. 2) of an electronic device 301 according to an example embodiment may track an eye 309 of a user, i.e., a gaze of the user, using light (e.g., infrared light) output from a display 320 (e.g., the first display 205 and the second display 210 of FIG. 2).

A second camera (e.g., the second cameras 270a and 270b of FIG. 2) may be the ET camera 310 that collects information for positioning a center of a virtual image projected onto the electronic device 301 based on a direction at which pupils of the user who wears the electronic device 301 gaze. The second camera may also include a GS camera to detect the pupils and track a fast movement of the pupils. Respective ET cameras for a right eye and a left eye may be installed, and the ET cameras having the same performance and specifications may be used. The ET camera 310 may include an ET sensor 315. The ET sensor 315 may be included inside the ET camera 310. The infrared light output from the display 320 may be transmitted as an infrared reflected light 303 to the eye 309 of the user by a half mirror. The ET sensor 315 may detect an infrared transmitted light 305 that is generated as the infrared reflected light 303 is reflected from the eye 309 of the user. The ET camera 310 may track the eye 309 of the user, that is, the gaze of the user, based on a result of the detection by the ET sensor 315.

The display 320 may include a plurality of visible light pixels and a plurality of infrared pixels. The visible light pixels may include red (R), green (G), and blue (B) pixels. The visible light pixels may output a visible light corresponding to a virtual object image. The infrared pixels may output an infrared light. The display 320 may include, for example, a micro-LED or an OLED.

A display waveguide 350 and an ET waveguide 360 may be included in a transparent member 370 (e.g., the first transparent member 225a and the second transparent member 225b of FIG. 2). The transparent member 370 may be formed of, for example, a glass plate, a plastic plate, or a polymer, and may be transparently or translucently formed. The transparent member 370 may be arranged to face the eyes of the user. In this case, a distance between the transparent member 370 and the eye 309 of the user may be referred to as a pupil distance, e.g., an "eye relief" 380.

The transparent member 370 may include the waveguides 350 and 360. The transparent member 370 may include an input optical member 330 and an output optical member 340. The transparent member 370 may also include an ET splitter 375 that splits an input light into a plurality of waveguides.

According to an example embodiment, a light incident on one end of the display waveguide 350 may be propagated inside the display waveguide 350 by a nanopattern and may thus be provided to the user. In addition, the display waveguide 350 formed as a free-form prism may provide the incident light as an image light to the user through a reflection mirror. The display waveguide 350 may include at least one of a reflective element (e.g., a reflection mirror) or at least one diffractive element (e.g., a diffractive optical element (DOE) or a holographic optical element (HOE)). The display waveguide 350 may guide a display light (e.g., the image light) emitted from the light source to the eyes of the user, using the at least one diffractive element or the reflective element included in the display waveguide 350. Although the output optical member 340 is illustrated in FIG. 3 as being separate from the ET waveguide 360, the output optical member 340 may be included in the ET waveguide 360.

According to various example embodiments, the diffractive element may include the input optical member 330 and the output optical member 340. For example, the input optical member 330 may, for example, refer to an input grating area. The output optical member 340 may, for example, refer to an output grating area. The input grating area may serve as an input end that diffracts (or reflects) light output from, for example, a micro-LED, to transmit the light to a transparent member (e.g., a first transparent member and a second transparent member) of a screen display portion.

The output grating area may serve as an exit that diffracts (or reflects), to the eyes of the user, the light transmitted to the transparent member (e.g., the first transparent member and the second transparent member) of a waveguide.

According to various example embodiments, the reflective element may include, for total internal reflection (TIR), a TIR optical element or a TIR waveguide. For example, TIR, which is a scheme of inducing light, may form an angle of incidence such that light (e.g., a virtual image) input through the input grating area is reflected 100% from one surface (e.g., a specific surface) of the waveguide, to transmit the light 100% to the output grating area.

In an example embodiment, a light path of the light emitted from the display 320 may be guided to the waveguide through the input optical member 330. The light traveling in the waveguide may be guided toward the eyes of the user through the output optical member 340. The screen display portion may be determined based on the light emitted toward the eyes of the user.

Figure 4A:
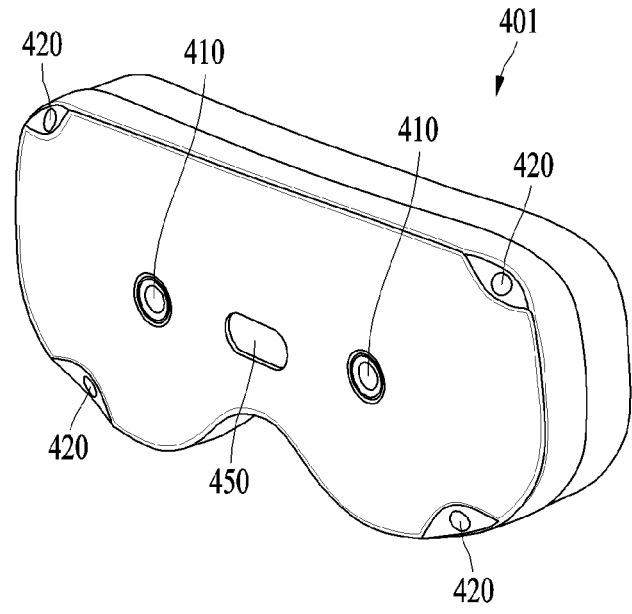
FIGS. 4A and 4B is a diagram illustrating an example video see-through (VST) device according to various embodiments.
Figure 4B:
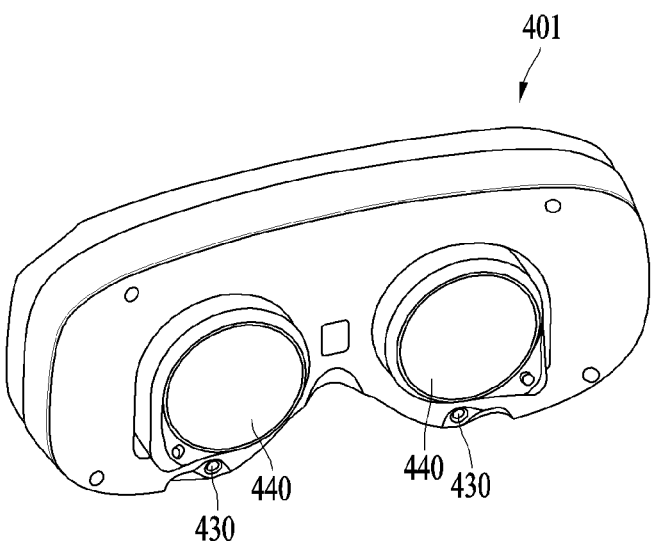

FIGS. 4A and 4B is a diagram illustrating an example video see-through (VST) device according to various embodiments.

An example transparent display has been described above with reference to FIGS. 2 and 3, but examples of a display are not limited thereto. Referring to FIGS. 4A and 4B, an electronic device 401 may include an opaque display 440. The electronic device 401 may generate a scene image corresponding to a field of view (FOV) of a user, based on image data captured using camera sensors 410 and 420 (e.g., the image capturing first cameras 265a and 265b or the third camera 245 of FIG. 2). The electronic device 401 may output the generated scene image through the opaque display 440. The electronic device 401 may provide a left eye of the user with a scene image corresponding to an FOV of the left eye and provide a right eye of the user with a scene image corresponding to an FOV of the right eye, through the display 440 and individual lenses. Accordingly, the user may receive visual information corresponding to an FOV, through a video image provided based on the camera, the display 440, and the lenses. The electronic device 401 shown in FIGS. 4A and 4B may, for example, also be referred to as a video see-through (VST) device. The electronic device 401 may include a face recognition camera 430.

For reference, an example arrangement of the camera sensors 410 and 420, a depth sensor 450, the display 440, or the lenses in the electronic device 401 is shown in FIGS. 4A and 4B, but this is merely an example arrangement and the disclosure is not limited in this respect.

Figure 5:
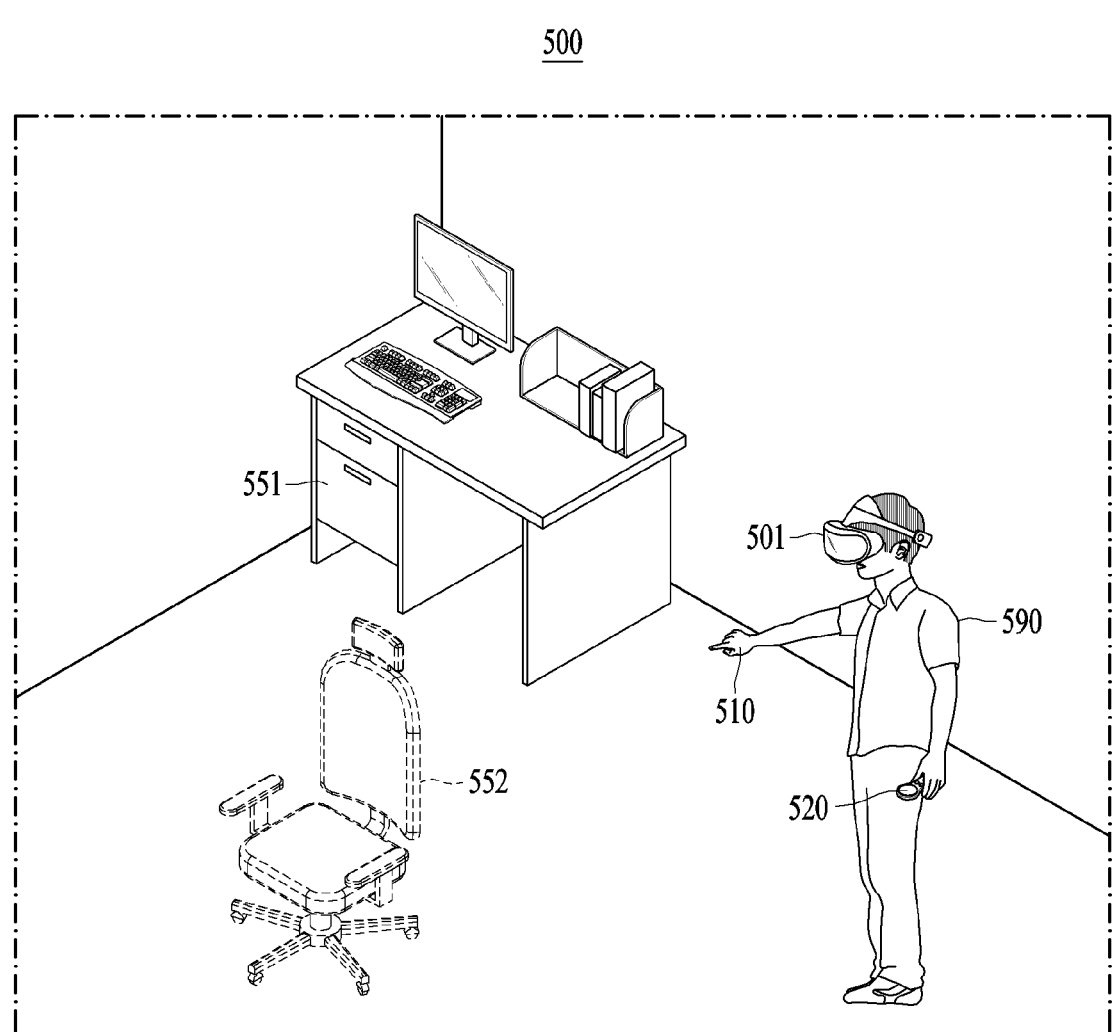
FIG. 5 is a diagram illustrating an example of construction of a virtual space, and input from and output to a user in the virtual space according to various embodiments.

FIG. 5 is a diagram illustrating an example of construction of a virtual space, and input from and output to a user in the virtual space according to various embodiments.

An electronic device 501 (e.g., the electronic device 101 of FIG. 1, the electronic device 201 of FIG. 2, the electronic device 301 of FIG. 3, or the electronic device 401 of FIGS. 4A and 4B) may obtain space information about a physical space in which sensors are located using the sensors. The space information about the physical space may include a geographic location of the physical space in which the sensors are located, a size of the space, an appearance of the space, a position of a physical object 551 disposed in the space, a size of the physical object 551, an appearance of the physical object 551, and illumination information (e.g., illuminant) The appearance of the space and the physical object 551 may include at least one of a shape, a texture, or a color of the space and the physical object 551. The illumination information, which is information about a light source that emits light acting in the physical space, may include at least one of an intensity, a direction, or a color of illumination. The sensors described above may collect information for providing AR. For example, in an AR device shown in FIGS. 2, 3, and 4, the sensors may include a camera and a depth sensor. However, the sensors are not limited thereto, and the sensors may further include at least one of an infrared sensor, a depth sensor (e.g., a light detection and ranging (lidar) sensor, a radio detection and ranging (radar) sensor, or a stereo camera), a gyro sensor, an acceleration sensor, or a geomagnetic sensor.

The electronic device 501 may collect the space information over a plurality of time frames. For example, in each time frame, the electronic device 501 may collect information about a space of a portion belonging to a scene within a sensing range (e.g., a field of view (FOV)) of a sensor at a position of the electronic device 501 in the physical space. The electronic device 501 may analyze the space information of the time frames and track a change (e.g., a position, movement, or state change) of an object over time. The electronic device 501 may integrally analyze the space information collected through the plurality of sensors, and may thereby obtain integrated space information (e.g., an image obtained by spatially stitching scenes around the electronic device 501 in the physical space) of an integrated sensing range of the plurality of sensors.

The electronic device 501 may analyze the physical space as three-dimensional (3D) information, using various input signals (e.g., sensing data of an RGB camera, an infrared sensor, a depth sensor, or a stereo camera) of the sensors. For example, the electronic device 501 may analyze at least one of the shape, the size, or the position of the physical space, and the shape, the size, or the position of the physical object 551.

For example, the electronic device 501 may detect an object captured in a scene corresponding to an FOV of a camera, using sensing data (e.g., a captured image) of the camera. The electronic device 501 may determine a label of the physical object 551 (e.g., as information indicating classification of an object, including values indicating a chair, a monitor, or a plant) from a two-dimensional (2D) scene image of the camera and an area (e.g., a bounding box) occupied by the physical object 551 in the 2D scene. Accordingly, the electronic device 501 may obtain 2D scene information from a position at which a user 590 is viewing. In addition, the electronic device 501 may also calculate a position of the electronic device 501 in the physical space based on the sensing data of the camera.

The electronic device 501 may obtain position information of the user 590 and depth information of a real space in a viewing direction, using sensing data (e.g., depth data) of a depth sensor. The depth information, which is information indicating a distance from the depth sensor to each point, may be expressed in the form of a depth map. The electronic device 501 may analyze a distance in the unit of each pixel at a 3D position at which the user 590 is viewing.

The electronic device 501 may obtain information including a 3D point cloud and mesh using various sensing data. The electronic device 501 may obtain a plane, a mesh, or a 3D coordinate point cluster that constitutes the space by analyzing the physical space. The electronic device 501 may obtain a 3D point cloud representing physical objects based on the information obtained as described above.

The electronic device 501 may obtain information including at least one of 3D position coordinates, 3D shapes, or 3D sizes (e.g., 3D bounding boxes) of the physical objects arranged in the physical space by analyzing the physical space.

Accordingly, the electronic device 501 may obtain physical object information detected in the 3D space and semantic segmentation information about the 3D space. The physical object information may include at least one of a position, an appearance (e.g., shape, texture, and color), or a size of the physical object 551 in the 3D space. The semantic segmentation information, which is information obtained by semantically segmenting the 3D space into subspaces, may include, for example, information indicating that the 3D space is segmented into an object and a background and information indicating that the background is segmented into, for example, a wall, a floor, and a ceiling. As described above, the electronic device 501 may obtain and store 3D information (e.g., space information) about the physical object 551 and the physical space. The electronic device 501 may store 3D position information of the user 590 in the space, along with the space information.

The electronic device 501 may construct a virtual space 500 based on the physical positions of the electronic device 501 and/or the user 590. The electronic device 501 may generate the virtual space 500 by referring to the space information described above. The electronic device 501 may generate the virtual space 500 of the same scale as the physical space based on the space information and arrange objects in the generated virtual space 500. The electronic device 501 may provide a complete VR to the user 590 by outputting an image that substitutes the entire physical space. The electronic device 501 may also provide mixed reality (MR) or augmented reality (AR) by outputting an image that substitutes a part of the physical space. Although the construction of the virtual space 500 based on the space information obtained by the analysis of the physical space has been described, the electronic device 501 may also construct the virtual space 500 irrespective of the physical position of the user 590. The virtual space 500 described herein may be a space corresponding to AR or VR and may also be referred to as a metaverse space.

For example, the electronic device 501 may provide a virtual graphic representation that substitutes at least a part of the physical space. The electronic device 501, which is an OST-based electronic device, may overlay the virtual graphic representation on a screen area corresponding to at least a partial space of a screen display portion. The electronic device 501, which is a VST-based electronic device, may output an image generated by substituting an image area corresponding to at least a partial space in a space image corresponding to a physical space rendered based on the space information with a virtual graphic representation. The electronic device 501 may substitute at least a part of a background in the physical space with a virtual graphic representation, but examples are not limited thereto. The electronic device 501 may only additionally arrange a virtual object 552 in the virtual space 500 based on the space information, without changing the background.

The electronic device 501 may arrange and output the virtual object 552 in the virtual space 500. The electronic device 501 may set a manipulation area for the virtual object 552 in a space occupied by the virtual object 552 (e.g., a volume corresponding to an appearance of the virtual object 552). The manipulation area may be an area in which a manipulation of the virtual object 552 occurs. In addition, the electronic device 501 may substitute the physical object 551 with a virtual object and output the virtual object. The virtual object corresponding to the physical object 551 may have the same or similar shape as or to the corresponding physical object 551. However, the various examples are not limited, and the electronic device 501 may set only the manipulation area in a space occupied by the physical object 551 or at a position corresponding to the physical object 551, without outputting a virtual object that substitutes the physical object 551. That is, the electronic device 501 may transmit, to the user 590, visual information representing the physical object 551 (e.g., a light reflected from the physical object 551 or an image obtained by capturing the physical object 551) without a change, and set the manipulation area in the physical object 551. The manipulation area may be set to have the same shape and volume as the space occupied by the virtual object 552 or the physical object 551, but examples are not limited thereto. The electronic device 501 may set the manipulation area that is smaller than the space occupied by the virtual object 552 or the space occupied by the physical object 551.

According to an example embodiment, the electronic device 501 may arrange a virtual object (e.g., an avatar object) representing the user 590 in the virtual space 500. When the avatar object is provided in a first-person view, the electronic device 501 may provide a visualized graphic representation corresponding to a part of the avatar object (e.g., a hand or a torso) to the user 590 via a display described above (e.g., an OST display or a VST display). However, examples are not limited thereto, and when the avatar object is provided in a third-person view, the electronic device 501 may provide a visualized graphic representation corresponding to an entire shape (e.g., a back view) of the avatar object to the user 590 via the display described above. The electronic device 501 may provide the user 590 with an experience integrated with the avatar object.

In addition, the electronic device 501 may provide an avatar object of another user who enters the same virtual space 500. The electronic device 501 may receive feedback information that is the same as or similar to feedback information (e.g., information based on at least one of visual sensation, auditory sensation, or tactile sensation) provided to another electronic device 501 entering the same virtual space 500. For example, when an object is arranged in a certain virtual space 500 and a plurality of users 590 access the virtual space 500, respective electronic devices 501 of the plurality of users 590 may receive feedback information (e.g., a graphic representation, a sound signal, or a haptic feedback) of the same object arranged in the virtual space 500 and provide the feedback information to the users 590.

The electronic device 501 may detect an input to an avatar object of another electronic device 501 and may receive feedback information from the avatar object of the other electronic device 501. An exchange of inputs and feedback for each virtual space 500 may be performed by a server (e.g., the server 108 of FIG. 1). For example, the server (e.g., a server providing a metaverse space) may transfer, to the users 590, inputs and feedback between the avatar object of the user 590 and an avatar object of another user 590. However, examples are not limited thereto, and the electronic device 501 may establish direct communication with another electronic device 501 to provide an input based on an avatar object or receive feedback, not via the server.

For example, based on detecting a user input that selects a manipulation area, the electronic device 501 may determine that the physical object 551 corresponding to the selected manipulation area is selected by the user 590. An input of the user 590 may include at least one of a gesture input made by using a body part (e.g., a hand or eye) of the user 590, an input made by using a separate VR accessory device, or a voice input of the user 590.

The gesture input may be an input corresponding to a gesture identified by tracking a body part 510 of the user 590 and may include, for example, an input indicating or selecting an object. The gesture input may include at least one of a gesture by which a body part (e.g., a hand) points toward an object for a predetermined period of time or more, a gesture by which a body part (e.g., a finger, an eye, or a head) points at an object, or a gesture by which a body part and an object contact each other spatially. A gesture of pointing to an object with an eye may be identified based on eye tracking. A gesture of pointing to an object with a head may be identified based on head tracking.

Tracking the body part 510 of the user 590 may be mainly performed based on a camera of the electronic device 501 but is not limited thereto. The electronic device 501 may track the body part 510 based on a cooperation of sensing data of a vision sensor (e.g., image data of a camera and depth data of a depth sensor) and information collected by accessory devices described below (e.g., controller tracking or finger tracking in a controller). Finger tracking may be performed by sensing a distance or contact between an individual finger and the controller based on a sensor (e.g., an infrared sensor) embedded in the controller.

VR accessory devices may include, for example, a ride-on device, a wearable device, a controller device 520, or other sensor-based devices. A ride-on device, which is a device operated by the user 590 riding thereon, may include, for example, at least one of a treadmill-type device and a chair-type device. A wearable device, which is a manipulation device worn on at least a part of the body of the user 590, may include, for example, at least one of a full body suit-type or a half body suit-type controller, a vest-type controller, a shoe type controller, a bag-type controller, a glove-type controller (e.g., a haptic glove), or a face mask-type controller. The controller device 520 may include an input device (e.g., a stick-type controller or a firearm) manipulated by a hand, foot, toe, or other parts of the body.

The electronic device 501 may establish direct communication with an accessory device and track at least one of a position or motion of the accessory device, but examples are not limited thereto. The electronic device 501 may communicate with the accessory device via a base station for VR.

For example, the electronic device 501 may determine that the virtual object 552 is selected, based on detecting an act of gazing at the virtual object 552 for a predetermined period of time or more through an eye or gaze tracking technology described above. For another example, the electronic device 501 may recognize a gesture of pointing to the virtual object 552 through a hand tracking technology. The electronic device 501 may determine that the virtual object 552 is selected, based on that a direction in which a tracked hand points indicates the virtual object 552 for a predetermined period of time or more or that a hand of the user 590 contacts or enters an area occupied by the virtual object 552 in the virtual space 500.

The voice input, which is an input corresponding to a user's voice obtained by the electronic device 501, may be sensed by, for example, an input module (e.g., a microphone) of the electronic device 501 or may include voice data received from an external electronic device of the electronic device 501. By analyzing the voice input, the electronic device 501 may determine that the physical object 551 or the virtual object 552 is selected. For example, based on detecting a keyword indicating at least one of the physical object 551 or the virtual object 552 from the voice input, the electronic device 501 may determine that at least one of the physical object 551 or the virtual object 552 corresponding to the detected keyword is selected.

The electronic device 501 may provide feedback to be described below as a response to the input of the user 590.

The feedback may include visual feedback, auditory feedback, tactile feedback, olfactory feedback, or gustatory feedback. The feedback may be rendered by the server 108, the electronic device 101, or the external electronic device 102 as described above with reference to FIG. 1.

The visual feedback may include an operation of outputting an image through the display (e.g., a transparent display or an opaque display) of the electronic device 501.

The auditory feedback may include an operation of outputting a sound through a speaker of the electronic device 501.

The tactile feedback may include force feedback that simulates a weight, a shape, a texture, a dimension, and dynamics. For example, a haptic glove may include a haptic element (e.g., an electric muscle) that simulates a sense of touch by tensing and relaxing the body of the user 590. The haptic element in the haptic glove may act as a tendon. The haptic glove may provide haptic feedback to the entire hand of the user 590. The electronic device 501 may provide feedback that represents a shape, a size, and/or stiffness of an object through the haptic glove. For example, the haptic glove may generate a force that simulates a shape, a size, and/or stiffness of an object. The exoskeleton of the haptic glove (or a suit-type device) may include a sensor and a finger motion measurement device, and may transmit a cable-pulling force (e.g., an electromagnetic, direct current (DC) motor-based, or pneumatic force) to fingers of the user 590 and may thereby transmit tactile information to the body. Hardware that provides such tactile feedback may include a sensor, an actuator, a power source, and a wireless transmission circuit. The haptic glove may operate by inflating and deflating an inflatable air bladder on the surface of the glove.

Based on an object in the virtual space 500 being selected, the electronic device 501 may provide feedback to the user 590. For example, the electronic device 501 may output a graphic representation (e.g., a representation of highlighting the selected object) indicating the selected object through the display. For another example, the electronic device 501 may output a sound (e.g., voice) notifying the selected object through a speaker. For still another example, the electronic device 501 may transmit an electrical signal to a haptic supporting accessory device (e.g., the haptic glove) and may thereby provide a haptic motion that simulates a tactile sensation of a corresponding object to the user 590.

Figure 6:
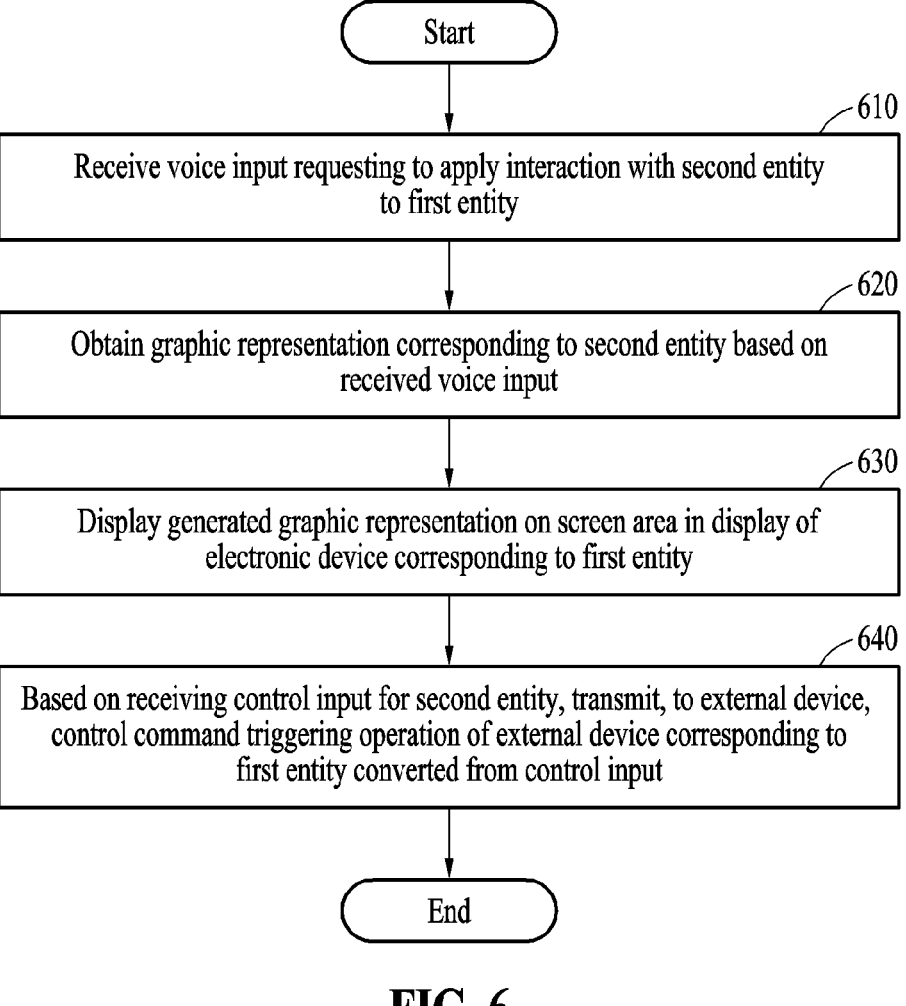
FIG. 6 is a diagram illustrating an example flow of operations performed by an electronic device to apply an interaction with another entity to an entity in a virtual space according to various embodiments.

FIG. 6 is a diagram illustrating an example flow of operations performed by an electronic device to apply an interaction with another entity to an entity in a virtual space according to various embodiments.

In a metaverse system according to an example embodiment, an interaction with another entity may be applied to an entity in a virtual space. The virtual space, which is a space provided by a server (e.g., the server 108 of FIG. 1), may represent a space where AR or VR is provided. For example, an input (e.g., a control input) for the other entity may be applied to the entity. For example, the entity may be a robot cleaner, and the other entity may be a dog. In this example, when a control input (e.g., go for a walk) for the dog is applied to the robot cleaner, the robot cleaner may be triggered to perform a cleaning operation. For another example, feedback (e.g., an image) on the other entity may be applied to the entity. For example, when feedback (e.g., an image) on the dog is applied to the robot cleaner, the image of the dog may be displayed on an area corresponding to the robot cleaner.

In operation 610, an electronic device may receive a voice input that requests to apply an interaction with a second entity to a first entity. According to an example embodiment, the electronic device may receive a voice input of a user from an input module (e.g., a microphone) of the electronic device.

In operation 620, the electronic device may obtain a graphic representation corresponding to the second entity based on the received voice input.

According to an example embodiment, the electronic device may transmit the received voice input to the server and obtain the graphic representation generated based on the voice input from the server. An operation of generating a graphic representation by the server will be described in detail below with reference to FIGS. 7 and 8. According to an example embodiment, the electronic device may generate the graphic representation corresponding to the second entity based on the received voice input. An operation of generating a graphic representation by the electronic device will be described below with reference to FIGS. 9 and 10.

In operation 630, the electronic device may display the generated graphic representation on a screen area corresponding to the first entity in a display of the electronic device.

In operation 640, based on receiving a control input for the second entity, the electronic device may transmit, to an external device corresponding to the first entity, a control command that triggers an operation of the external device converted from the control input.

According to an example embodiment, the electronic device may transmit the received control input for the second entity to the server and may transfer, through the server, the control command that triggers the operation of the external device corresponding to the first entity converted from the control input for the second entity. Such an operation of converting and transmitting a control command by the server will be described in detail below with reference to FIGS. 7 and 8. According to an example embodiment, the electronic device may convert the received control input for the second entity into the control command that triggers the operation of the external device corresponding to the first entity and may transmit the control command to the external device corresponding to the first entity. Such an operation of converting and transmitting a control command by the electronic device will be described in detail below with reference to FIGS. 9 and 10.

Although not shown in FIG. 6, the electronic device may receive a control input for the first entity. Based on receiving the control input for the first entity, the electronic device may transmit a control command that triggers an operation of the external device corresponding to the first entity to the external device corresponding to the first entity.

For example, based on receiving a voice input that requests to apply an interaction with the second entity to the first entity from the electronic device, the server may apply the interaction with the second entity to the first entity and may perform display and/or control accordingly. While the interaction with the second entity is being applied to the first entity, a control input for the first entity may be received. Even when the control input for the first entity is received while the interaction with the second entity is being applied to the first entity, a control command that triggers an operation of the external device corresponding to the first entity may be transmitted to the first entity.

Figure 7:
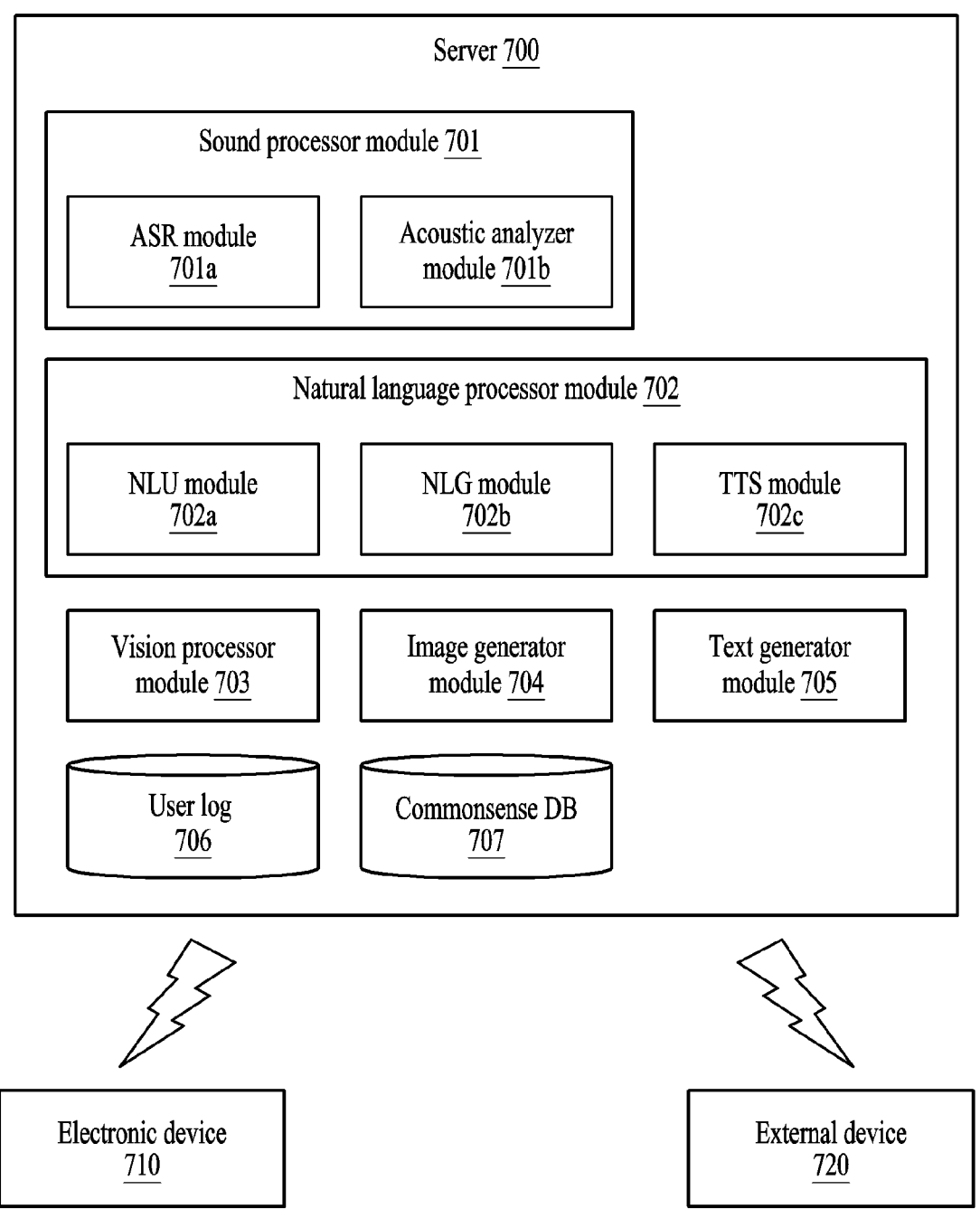
FIG. 7 is a diagram illustrating an example method in which a server applies an interaction with another entity to an entity in a virtual space according to various embodiments.

FIG. 7 is a diagram illustrating an example method in which a server applies an interaction with another entity to an entity in a virtual space according to various embodiments.

In a metaverse system according to an example embodiment, an interaction with another entity may be applied to an entity. A virtual space, which is a space provided by a server 700 (e.g., the server 108 of FIG. 1), may be a space where AR or VR is provided. For example, the server 700 may apply an input (e.g., a control input) for another entity to an entity in the virtual space. For example, the entity may be a robot cleaner, and the other entity may be a dog. The server 700 may apply a control input (e.g., go for a walk) for the dog to the robot cleaner in the virtual space to trigger the robot cleaner to perform a cleaning operation. For another example, the server 700 may apply feedback (e.g., an image) on another entity to an entity in the virtual space. In this example, the server 700 may apply feedback (e.g., an image) on the dog to the robot cleaner in the virtual space to output the image of the dog in an area corresponding to the robot cleaner.

The server 700 may establish wired and/or wireless communication with an electronic device 710 and an external device 720 corresponding to a first entity. The electronic device 710 (e.g., the electronic device 101 of FIG. 1, the electronic device 201 of FIG. 2, the electronic device 301 of FIG. 3, the electronic device 401 of FIGS. 4A and 4B, or the electronic device 501 of FIG. 5) may be an electronic device worn by a user and may transmit a user input from the user to the server 700. The server 700 may transmit a command to at least one of the electronic device 710 or the external device 720 corresponding to the first entity.

For example, the server 700 may receive, from the electronic device 710, a user input requesting to apply an interaction with a second entity to the first entity. The server 700 may transmit, to the electronic device 710, a display command for displaying a graphic representation corresponding to the second entity in an area corresponding to the first entity. Based on receiving the display command from the server 700, the electronic device 710 may display the graphic representation corresponding to the second entity in the area corresponding to the first entity. The server 700 may receive a control input for the second entity from the electronic device 710. The server 700 may convert the control input for the second entity to a control command that triggers an operation of the external device 720 corresponding to the first entity. The server 700 may transmit the converted control command to the external device 720 corresponding to the first entity.

The server 700 may include a sound processor module 701, a natural language processor module 702, a vision processor module 703, an image generator module 704, a text generator module 705, a user log 706, and a common-sense database (DB) 707.

The sound processor module 701 may process a sound input received from the electronic device 710. The sound input may be sound data sensed by an input module (e.g., a microphone) of the electronic device 710 and may include, for example, a voice input of the user and/or a background sound generated in a surrounding space around the user. For example, the sound processor module 701 may detect at least one of the voice input or the background sound from the sound input received from the electronic device 710.

According to an example embodiment, the sound processor module 701 may include an automatic speech recognition (ASR) module 701a and an acoustic analyzer module 701b. The ASR module 701a may convert the voice input into text data. The acoustic analyzer module 701*b* may analyze the background sound. For example, the acoustic analyzer module 701*b* may obtain background sound information representing a feature of the background sound. The feature of the background sound may include a feature of the background sound as sound data, for example, at least one of a sound intensity, a sound frequency, or a sound waveform corresponding to the sound data. An operation of obtaining background sound information through the acoustic analyzer module 701*b* will be described in detail below with reference to FIG. 12.

The natural language processor module 702 may process natural language data or generate natural language data. According to an example embodiment, the natural language processor module 702 may include a natural language understanding (NLU) module 702*a*, a natural language generator (NLG) module 702*b*, and a text-to-speech (TTS) module 702*c*.

The NLU module 702*a* may determine a user's intent using the text data of the voice input. For example, the NLU module 702*a* may determine the user's intent by performing a syntactic analysis or a semantic analysis. The NLU module 702*a* may determine a meaning of a word extracted from the voice input using a linguistic feature (e.g., a grammatical element) of a morpheme or phrase, and determine the user's intent by matching the determined meaning of the word to the intent. For example, the NLU module 702*a* may determine that the user's intent is to request to apply an interaction with a second entity to a first entity by analyzing the text data of the voice input. The NLG module 702*b* may convert specified information into the form of text. The information converted into the form of text by the NLG module 702*b* may be in the form of a natural language utterance. For example, the NLG module 702*b* may convert information about a state of the first entity into the form of text. The TTS module 702*c* may convert the information in the form of text into information in the form of speech. For example, the TTS module 702*c* may convert the information in the form of text about the state of the first entity into the information in the form of speech.

The vision processor module 703 may obtain feature information representing an image feature by analyzing an image received from the electronic device 710. The image feature may include, for example, a feature of an entity included in the image, a feature (e.g., illumination) of an environment in which the image is captured, a texture of the image, and the like. For example, the vision processor module 703 may be implemented using a machine learning model. The vision processor module 703 may calculate the feature information of the image by applying the machine learning model to the image. As will be described below, the vision processor module 703 may obtain space information representing a feature of a surrounding space around the user and/or input image information representing a feature of an input image. Obtaining the space information and the input image information will be described in detail below with reference to FIG. 12.

The image generator module 704 may generate a graphic representation based on a user input. For example, the user input may be an input that requests to apply an interaction with the second entity to the first entity. The image generator module 704 may generate a graphic representation corresponding to the second entity.

According to an example embodiment, the image generator module 704 may generate the graphic representation based on at least one of the voice input of the user, the background sound, the space image, the input image, or metadata. The voice input of the user may be, of a sound input received from the electronic device 710, an input corresponding to a voice that is based on a user's utterance. The background sound may be, of the sound input, an input corresponding to a background sound that is distinguished from the voice of the user. The background sound may include, for example, background music played in the surrounding space of the user and other various sounds generated by the environment of the surrounding space of the user (e.g., a construction sound, a horn sound of a car, a wave sound, a wind sound, a train sound, etc.). The space image may be an image including the surrounding space of the user. The input image may be an image including an area corresponding to the second entity selected by the user. The metadata may be at least one of weather data, time data, or geographic data. Generating a graphic representation through an image generator module will be described in detail below with reference to FIG. 12.

The text generator module 705 may generate text data about at least one of the first entity or the second entity. For example, the text generator module 705 may convert text data about one of the first entity and the second entity into text data about the other entity to generate text data about the other entity. For example, the text generator module 705 may generate text data about the second entity based on text data about the first entity. For example, the text generator module 705 may generate the text data about the first entity based on the text data about the second entity. For example, the text generator module 705 may generate the text data about the other entity based on information about one of the first entity and the second entity. For example, the text generator module 705 may generate the text data about the second entity based on state information of the first entity. Generating text through a text generator module will be described in detail below with reference to FIGS. 16 and 17.

The user log 706 may refer to a DB in which, for example, information received from the electronic device 710 worn by the user is stored for each user.

The commonsense DB 707 may refer to a DB in which, for example, word sets associated with a plurality of entities are stored. For example, the commonsense DB 707 may store a word set for each of the plurality of entities. A word set associated with an entity may include words associated with at least one of a state, a function, or an operation of the entity. For example, in a case in which the first entity is a robot cleaner, a first word set associated with the first entity may include a first word (e.g., "cleaning"), a second word (e.g., "charging"), and a third word (e.g., "breakdown"). In a case in which the second entity is a dog, a second word set associated with the second entity may include a fourth word (e.g., "going for a walk"), a fifth word (e.g., "eating"), and a sixth word (e.g., "going to the hospital"). As will be described below with reference to FIG. 14, the server 700 may obtain a mapping relationship between the first word set and the second word set.

According to an example embodiment, some or all of the functions of the server 700 may be implemented in the electronic device 710 or the external device 720 corresponding to the first entity.

FIG. 8 is a diagram illustrating an example method in which a server applies an interaction with a second entity to a first entity and displays and controls it according to various embodiments.

In operation 810, a server (e.g., the server 108 of FIG. 1 or the server 700 of FIG. 7) may receive a voice input that requests to apply an interaction with a second entity to a first entity from an electronic device (e.g., the electronic device 101 of FIG. 1, the electronic device 201 of FIG. 2, the electronic device 301 of FIG. 3, the electronic device 401 of FIGS. 4A and 4B, the electronic device 501 of FIG. 5, or the electronic device 710 of FIG. 7) worn by a user.

According to an example embodiment, the server may receive sound data from the electronic device. The server may extract a voice input of the user and a background sound from the received sound data, using a sound processor module (e.g., the sound processor module 701 of FIG. 7). The voice input of the user may include an input that requests to apply an interaction with the second entity to the first entity. The server may convert the voice input into text data, using an ASR module (e.g., the ASR module 701*a* of FIG. 7) of the sound processor module. The server may calculate background sound information from the background sound, using an acoustic analyzer module (e.g., the acoustic analyzer module 701*b* of FIG. 7) of the sound processor module. As will be described below with reference to FIG. 12, the text data of the voice input and the background sound information may be used to generate a graphic representation.

For example, the voice input of the user may include a voice input corresponding to a user's utterance "Change the robot cleaner to a dog." In this example, the server may determine the first entity and the second entity as the robot cleaner and the dog, respectively.

In operation 820, the server may generate a graphic representation corresponding to the second entity based on the received voice input. The server may generate the graphic representation corresponding to the second entity, using an image generator module (e.g., the image generator module 704 of FIG. 7). For example, the server may generate the graphic representation corresponding to the second entity by applying the image generator module to at least a portion of the voice input of the user. As will be described below with reference to FIG. 12, the server may generate the graphic representation based on at least one of space information, input image information, background sound information, or meta information, along with the voice input of the user. For example, the server may generate a graphic representation corresponding to the dog which is the second entity.

In operation 830, the server may transmit, to the electronic device, a display command that triggers displaying the generated graphic representation. The display command may trigger the electronic device to display the graphic representation corresponding to the second entity on a screen area corresponding to the first entity in a display module of the electronic device. Based on receiving the display command from the server, the electronic device may display the graphic representation corresponding to the second entity on the screen area corresponding to the first entity. The screen area corresponding to the first entity may be a partial area where light reflected from the first entity and directed to the eyes of the user passes through a transparent display of the electronic device and/or a partial area where the first entity is displayed on the display module of the electronic device. For example, the server may command the electronic device to display a graphic representation corresponding to the dog which is the second entity, in an area corresponding to the robot cleaner which is the first entity.

According to an example embodiment, the electronic device may completely change the first entity to the graphic representation corresponding to the second entity and display it. The server may provide the user with an interface of a virtual space in which the first entity is completely changed to the graphic representation corresponding to the second entity. For example, the electronic device (e.g., an OST device) may display the graphic representation corresponding to the second entity on the screen area corresponding to the first entity, and may thus preclude light reflected from an external device corresponding to the first entity and directed toward the eyes of the user from reaching the eyes of the user. For example, the electronic device (e.g., a VST device) may display the graphic representation corresponding to the second entity, excluding displaying the screen area corresponding to the first entity, and may thus preclude an area associated with the first entity from being displayed through the display of the electronic device.

According to an example embodiment, the electronic device may partially change the first entity to the second entity and display it. The server may provide the user with an interface of the virtual space in which the graphic representation of the first entity is partially changed to the graphic representation corresponding to the second entity. For example, the electronic device (e.g., an OST device) may display the graphic representation of the second entity such that at least a portion of light reflected from the external device corresponding to the first entity and directed toward the eyes of the user reaches the eyes of the user, along with the graphic representation of the second entity. For example, the electronic device may display the graphic representation corresponding to the second entity on a partial area of the screen area corresponding to the first entity. For example, the electronic device may display the graphic representation corresponding to the second entity with transparency. For example, the electronic device (e.g., the VST device) may display the first entity and the second entity together by displaying the graphic representation corresponding to the second entity together with the screen area corresponding to the first entity.

In operation 840, based on receiving a control input for the second entity from the electronic device, the server may convert the control input into a control command that triggers an operation of the external device corresponding to the first entity. The control input for the second entity may be a user input that requests the second entity to perform an operation of the second entity. The control input for the second entity may be, but is not limited to, a voice input of the user, and may be an input generated through an interaction between a screen for the second entity (e.g., a screen for detecting the control input for the second entity) and the user.

According to an example embodiment, the server may receive the control input of the user for the second entity from the electronic device. By analyzing the received control input, the server may determine an operation of the external device corresponding to the first entity corresponding to the control input for the second entity. For example, based on receiving the control input for the second entity, the server may determine the operation of the second entity indicated by the control input for the second entity. The server may determine the operation of the external device corresponding to the first entity based on the determined operation of the second entity. For example, the server may determine the operation of the external device corresponding to the first entity corresponding to the control input, based on a mapping relationship between a first word set associated with the first entity and a second word set associated with the second entity. The server may convert the received control input for the second entity into the control command that triggers the operation of the external device corresponding to the first entity corresponding to the control input.

For example, the server may receive a control input of the user corresponding to a user's utterance "Walk the dog" from the electronic device. The control input may be determined as an input that requests the dog which is the second entity to perform an operation (e.g., walking) of the second entity. Based on the control input, the server may determine an operation (e.g., cleaning) of the external device (e.g., a robot cleaner) corresponding to the first entity corresponding to the operation (e.g., walking) of the second entity. The server may convert the control input into a control command that triggers a cleaning operation of the robot cleaner.

In operation 850, the server may transmit the control command to the external device corresponding to the first entity. Based on receiving the control command from the server, the external device corresponding to the first entity may perform the operation indicated by the control command. For example, the robot cleaner which is the external device corresponding to the first entity may receive the control command that triggers the cleaning operation of the robot cleaner from the server. The robot cleaner may perform the cleaning operation.

Although not shown in FIG. 8, the server may receive a control input for the first entity from the electronic device. Based on receiving the control input for the first entity from the electronic device, the server may transmit a control command based on the control input for the first entity to the external device corresponding to the first entity.

For example, based on receiving a voice input that requests to apply an interaction with the second entity to the first entity from the electronic device, the server may apply the interaction with the second entity to the first entity and may perform display and/or control accordingly. The server may receive a control input for the first entity while applying the interaction with the second entity to the first entity. Even when the server receives the control input for the first entity while applying the interaction with the second entity to the first entity, the server may transmit a control command that triggers an operation of the external device corresponding to the first entity to the external device corresponding to the first entity.

Figure 9:
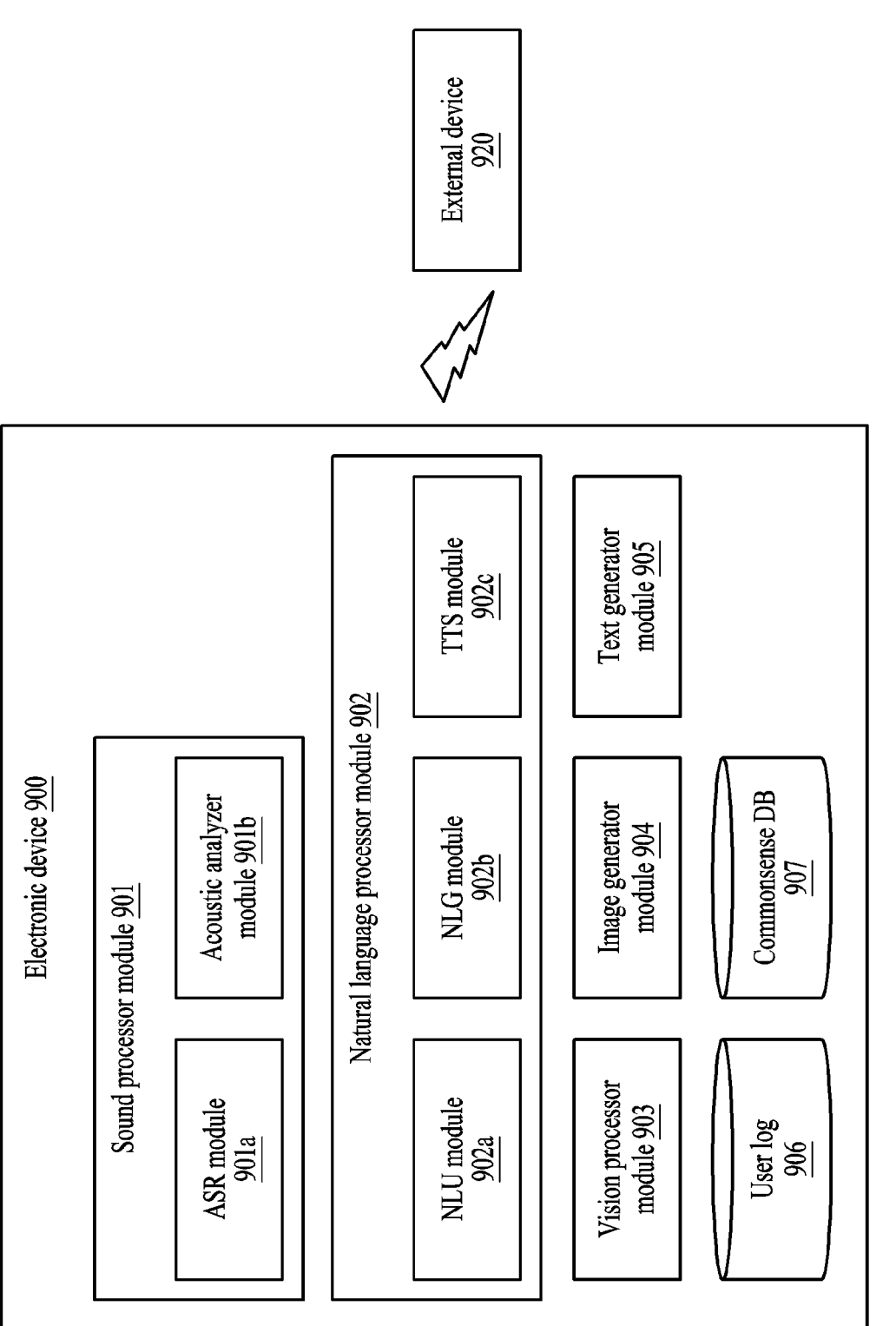
FIG. 9 is a diagram illustrating an example method in which an electronic device applies an interaction with another entity to an entity in a virtual space according to various embodiments.

FIG. 9 is a diagram illustrating an example method in which an electronic device applies an interaction with another entity to an entity in a virtual space according to various embodiments.

An example in which a server generates a graphic representation and converts a control input to apply an interaction with another entity to an entity in a virtual space is described above with reference to FIG. 7, but examples are not limited thereto. For example, according to an example embodiment, an electronic device 900 (e.g., the electronic device 101 of FIG. 1, the electronic device 201 of FIG. 2, the electronic device 301 of FIG. 3, the electronic device 401 of FIGS. 4A and 4B, the electronic device 501 of FIG. 5, or the electronic device 710 of FIG. 7) may generate a graphic representation and convert a control input to apply an interaction with another entity.

According to an example embodiment, the electronic device 900 may apply an input (e.g., a control input) for another entity to an entity in a virtual space. For example, the entity may be a robot cleaner, and the other entity may be a dog. The electronic device 900 may apply a control input (e.g., go for a walk) for the dog to the robot cleaner in the virtual space and may thereby trigger the robot cleaner to perform a cleaning operation. For another example, the electronic device 900 may apply feedback (e.g., an image) on the other entity to the entity in the virtual space. For example, the electronic device 900 may apply feedback (e.g., an image) on the dog to the robot cleaner in the virtual space and output the image of the dog in an area corresponding to the robot cleaner.

The electronic device 900, which may be, for example, an electronic device worn by a user, may obtain a user input. The electronic device 900 may establish wired and/or wireless communication with an external device 920 corresponding to a first entity. The electronic device 900 may transmit a command to the external device 920 (e.g., the external device 720 of FIG. 7) corresponding to the first entity.

For example, the electronic device 900 may obtain a user input that requests to apply an interaction with a second entity to the first entity. The electronic device 900 may generate a graphic representation corresponding to the second entity based on the obtained user input. The electronic device 900 may display the graphic representation corresponding to the second entity on an area corresponding to the first entity (e.g., 920) in a display module of the electronic device 900. The electronic device 900 may obtain a control input for the second entity. Based on receiving the control input for the second entity, the electronic device 900 may convert the control input for the second entity into a control command that triggers an operation of the external device 920 corresponding to the first entity. The electronic device 900 may transmit the converted control command to the external device 920 corresponding to the first entity.

The electronic device 900 may include at least one of a sound processor module 901, a natural language processor module 902, a vision processor module 903, an image generator module 904, a text generator module 905, a user log 906, or a commonsense DB 907.

The sound processor module 901, the natural language processor module 902, and the text generator module 905 of the electronic device 900 may respectively perform the same or similar functions performed by the sound processor module 701, the natural language processor module 702, and the text generator module 705 described above with reference to FIG. 7.

According to an example embodiment, the sound processor module 901 may include an ASR module 901a and an acoustic analyzer module 901b. The ASR module 901a and the acoustic analyzer module 901b may respectively perform the same or similar functions performed by the ASR module 701a and the acoustic analyzer module 701b described above with reference to FIG. 7.

According to an example embodiment, the natural language processor module 902 may include an NLU module 902a, an NLG module 902b, and a TTS module 902c. The NLU module 902a, the NLG module 902b, and the TTS module 902c may respectively perform the same or similar functions performed by the NLU module 702a, the NLG module 702b, and the TTS module 702c described above with reference to FIG. 7.

According to an example embodiment, the vision processor module 903 may analyze an obtained image and obtain feature information representing a feature of the image. The feature of the image may include, for example, a feature of an entity included in the image, a feature (e.g., illumination) of an environment in which the image is captured, a texture of the image, and the like. For example, the vision processor module 903 may be implemented using a machine learning model. The vision processor module 903 may calculate the feature information of the image by applying the machine learning model to the image. As will be described below, the vision processor module 903 may obtain space information representing a feature of a surrounding space around the user and/or input image information representing a feature of an input image. Obtaining the space information and the input image information will be described in detail below with reference to FIG. 12.

The image generator module 904 may generate a graphic representation based on user input. For example, the user input may be an input that requests to apply an interaction with the second entity to the first entity. The image generator module 904 may generate a graphic representation corresponding to the second entity.

According to an example embodiment, the image generator module 904 may generate the graphic representation based on at least one of a voice input of the user, a background sound, a space image, an input image, or metadata. The voice input of the user may be, of an obtained sound input, an input corresponding to a voice that is based on a user's utterance. The background sound may be, of the sound input, an input corresponding to a background sound that is distinguished from the voice of the user. The background sound may include, for example, background music played in the surrounding space of the user and sounds generated by the environment of the surrounding space of the user (e.g., a construction sound, a horn sound of a car, a wave sound, a wind sound, a train sound, etc.). The space image may be an image including the surrounding space of the user. The input image may be an image including an area corresponding to the second entity selected by the user. The metadata may be at least one of weather data, time data, or geographic data. Generating a graphic representation through an image generator module will be described in detail below with reference to FIG. 12.

The user log 906 may refer to a DB in which, for example, information collected from the electronic device 900 worn by the user is stored for each user.

The commonsense DB 907 may store the same or similar information as the information stored in the commonsense DB 707 described above with reference to FIG. 7.

According to an example embodiment, some or all of the functions of the electronic device 900 may be implemented in a separate server.

Figure 10:
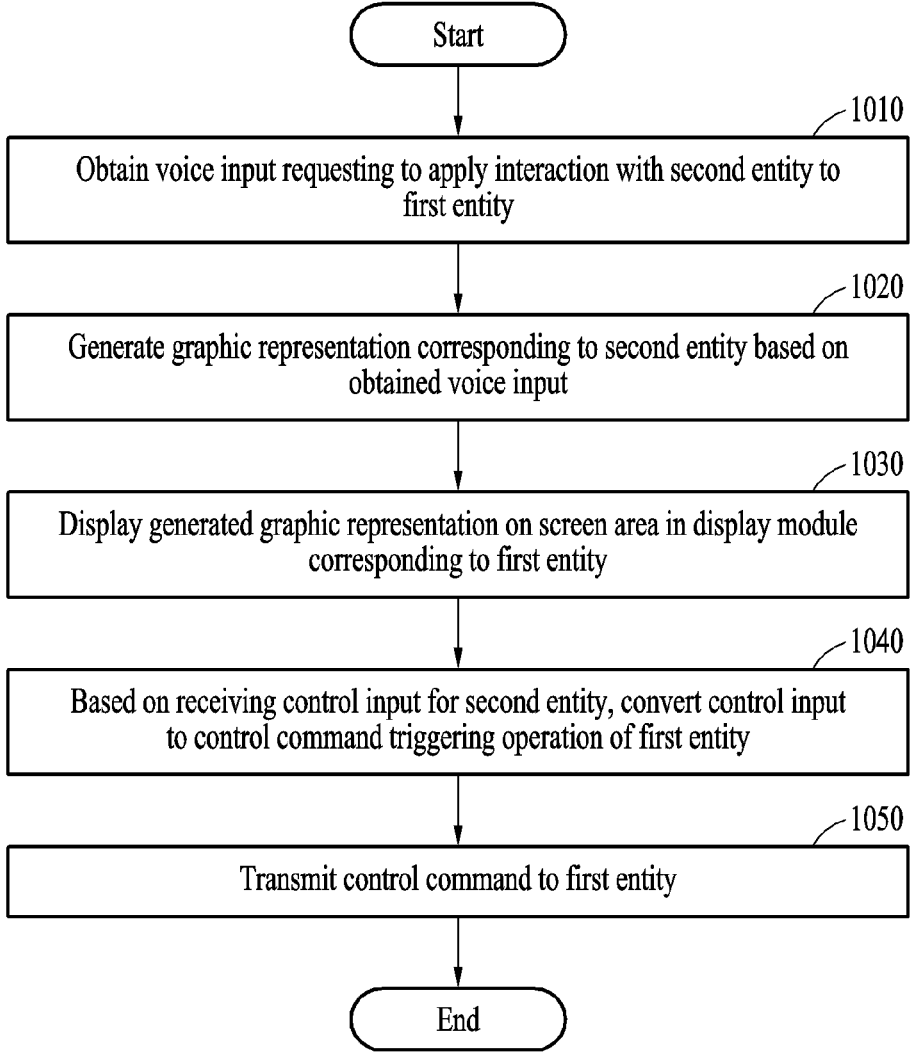
FIG. 10 is a diagram illustrating an example method in which an electronic device applies an interaction with a second entity to a first entity and displays and controls it according to various embodiments.

FIG. 10 is a diagram illustrating an example method in which an electronic device applies an interaction with a second entity to a first entity and displays and controls it according to various embodiments.

In operation 1010, an electronic device (e.g., the electronic device 101 of FIG. 1, the electronic device 201 of FIG. 2, the electronic device 301 of FIG. 3, the electronic device 401 of FIGS. 4A and 4B, the electronic device 501 of FIG. 5, the electronic device 710 of FIG. 7, or the electronic device 900 of FIG. 9) may obtain a voice input that requests to apply an interaction with a second entity to a first entity.

According to an example embodiment, the electronic device may obtain sound data through an input module (e.g., a microphone) of the electronic device. The electronic device may extract a voice input of a user and a background sound from the received sound data, using a sound processor module (e.g., the sound processor module 901 of FIG. 9). The voice input of the user may include an input that requests to apply an interaction with the second entity to the first entity. The electronic device may convert the voice input into text data, using an ASR module (e.g., the ASR module 901a of FIG. 9) of the sound processor module. The electronic device may calculate background sound information from the background sound, using an acoustic analyzer module (e.g., the acoustic analyzer module 901b of FIG. 9) of the sound processor module. As will be described below with reference to FIG. 12, the text data of the voice input and the background sound information may be used to generate a graphic representation.

For example, the voice input of the user may include a voice input corresponding to a user's utterance "Change the robot cleaner to a dog." The electronic device may determine the first entity and the second entity as the robot cleaner and the dog, respectively.

In operation 1020, the electronic device may generate a graphic representation corresponding to the second entity based on the obtained voice input. The electronic device may generate the graphic representation corresponding to the second entity, using an image generator module (e.g., the image generator module 904 of FIG. 9). For example, the electronic device may generate the graphic representation corresponding to the second entity by applying the image generator module to at least a portion of the voice input of the user. As will be described below with reference to FIG. 12, the electronic device may generate the graphic representation based on at least one of space information, input image information, background sound information, or meta information, along with the voice input of the user. For example, the electronic device may generate a graphic representation corresponding to the dog which is the second entity.

In operation 1030, the electronic device may display the graphic representation corresponding to the second entity on a screen area corresponding to the first entity in a display module. The screen area corresponding to the first entity may be a partial area where light reflected from an external device corresponding to the first entity and directed to the eyes of the user passes through a transparent display of the electronic device and/or a partial area where the first entity is displayed on the display module of the electronic device. For example, the electronic device may display a graphic representation corresponding to the dog, which is the second entity, on an area corresponding to the robot cleaner, which is the first entity.

According to an example embodiment, the electronic device may completely change the first entity to the second entity and display it. The electronic device may provide the user with an interface of a virtual space in which the first entity is completely changed to a graphic representation corresponding to the second entity. For example, the electronic device (e.g., an OST device) may display the graphic representation corresponding to the second entity on the screen area corresponding to the first entity, and may thus preclude light reflected from the external device corresponding to the first entity and directed toward the eyes of the user from reaching the eyes of the user. For example, the electronic device (e.g., a VST device) may display the graphic representation corresponding to the second entity, excluding displaying the screen area corresponding to the first entity, and may thus preclude an area associated with the first entity from being displayed through the display of the electronic device.

According to an example embodiment, the electronic device may partially change the first entity to the second entity and display it. The electronic device may provide the user with an interface of the virtual space in which the first entity is partially changed to a graphic representation corresponding to the second entity. For example, the electronic device (e.g., an OST device) may display the graphic representation of the second entity such that at least a portion of light reflected from the external device corresponding to the first entity and directed toward the eyes of the user reaches the eyes of the user, along with the graphic representation of the second entity. For example, the electronic device may display the graphic representation corresponding to the second entity on a partial area of the screen area corresponding to the first entity. For example, the electronic device may display the graphic representation corresponding to the second entity, with transparency. For example, the electronic device (e.g., a VST device) may display the first entity and the second entity together by displaying the graphic representation corresponding to the second entity together with the screen area corresponding to the first entity.

In operation 1040, based on obtaining a control input for the second entity, the electronic device may convert the control input into a control command that triggers an operation of the external device corresponding to the first entity. The control input for the second entity may be a user input that requests the second entity to perform an operation of the second entity. The control input for the second entity may be, but is not limited to, a voice input of the user, and may be an input generated through an interaction between a screen for the second entity (e.g., a screen for detecting the control input for the second entity) and the user.

According to an example embodiment, the electronic device may obtain the control input of the user for the second entity through an input module (e.g., a microphone) of the electronic device. By analyzing the obtained control input, the electronic device may determine an operation of the external device corresponding to the first entity corresponding to the control input for the second entity. For example, based on obtaining the control input for the second entity, the electronic device may determine an operation of the second entity indicated by the control input for the second entity. The electronic device may determine the operation of the external device corresponding to the first entity based on the determined operation of the second entity. For example, the electronic device may determine the operation of the external device corresponding to the first entity corresponding to the control input, based on a mapping relationship between a first word set associated with the first entity and a second word set associated with the second entity. The electronic device may convert the obtained control input for the second entity into the control command that triggers the operation of the external device corresponding to the control input.

For example, the electronic device may receive a control input of the user corresponding to a user's utterance "Walk the dog" from the electronic device. The control input may be determined as an input that requests the dog which is the second entity to perform an operation (e.g., walking) of the second entity. Based on the control input, the electronic device may determine an operation (e.g., cleaning) of the external device (e.g., the robot cleaner) corresponding to the first entity corresponding to the operation (e.g., walking) of the second entity. The electronic device may convert the control input into a control command that triggers a cleaning operation of the robot cleaner.

In operation 1050, the electronic device may transmit the control command to the external device corresponding to the first entity. Based on receiving the control command from the server, the external device corresponding to the first entity may perform the operation indicated by the control command. For example, the robot cleaner which is the external device corresponding to the first entity may receive the control command that triggers the cleaning operation of the robot cleaner from the electronic device. The robot cleaner may perform the cleaning operation.

Although not shown in FIG. 10, the electronic device may obtain a control input for the first entity. Based on obtaining the control input for the first entity, the electronic device may transmit a control command based on the control input for the first entity to the external device corresponding to the first entity.

For example, based on receiving a voice input that requests to apply an interaction with the second entity to the first entity from the electronic device, the electronic device may apply the interaction with the second entity to the first entity to perform display and/or control accordingly. The server may receive a control input for the first entity while applying the interaction with the second entity to the first entity. Even when the server receives the control input for the first entity while applying the interaction with the second entity to the first entity, the server may transmit a control command that triggers an operation of the external device corresponding to the first entity to the external device corresponding to the first entity.

Figure 11:
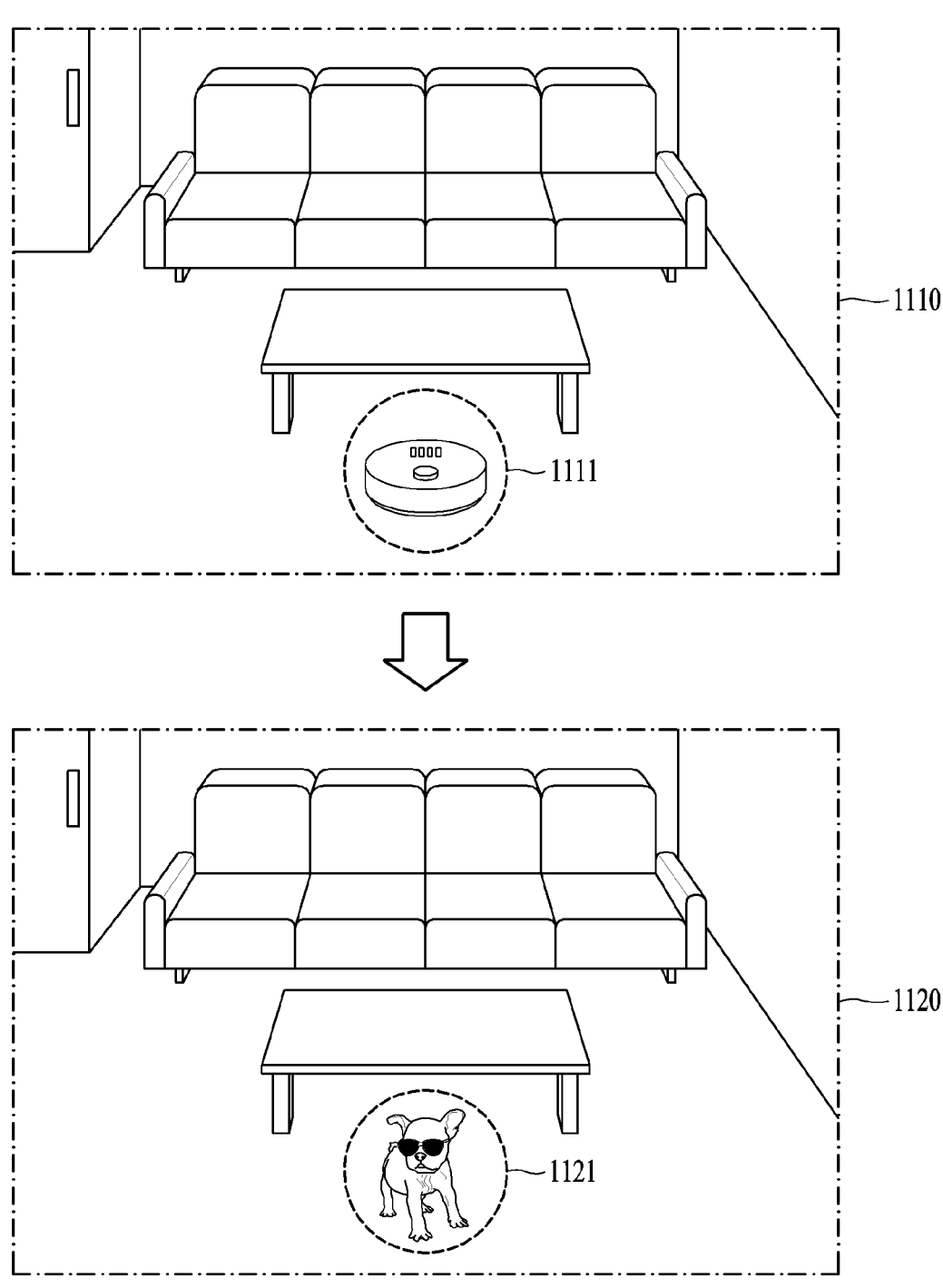
FIG. 11 is a diagram illustrating an example screen displayed as an electronic device changes a first entity to a graphic representation corresponding to a second entity and displays it according to various embodiments.

FIG. 11 is a diagram illustrating an example screen displayed as an electronic device changes a first entity to a graphic representation corresponding to a second entity and displays it according to various embodiments.

An electronic device (e.g., the electronic device 101 of FIG. 1, the electronic device 201 of FIG. 2, the electronic device 301 of FIG. 3, the electronic device 401 of FIGS. 4A and 4B, the electronic device 501 of FIG. 5, the electronic device 710 of FIG. 7, or the electronic device 900 of FIG. 9) may provide a user with a shape of a first entity in an area 1111 corresponding to the first entity. For example, the user of the electronic device (e.g., an OST device) may visually recognize the first entity, through an external device corresponding to the first entity in the screen area 1111 corresponding to the first entity in a screen area 1110. For example, the electronic device (e.g., a VST device) may display the first entity on the screen area 1111 corresponding to the first entity in the screen area 1110.

Based on obtaining a voice input of the user that requests to apply an interaction with a second entity to the first entity, the electronic device may change the first entity to a graphic representation corresponding to the second entity and display the changed graphic representation.

Based on receiving the voice input that requests to apply the interaction with the second entity (e.g., a dog) to the first entity (e.g., a robot cleaner), the electronic device may change the first entity to the second entity and display the changed entity. The electronic device may display a graphic representation 1121 corresponding to the second entity on the screen area 1111 corresponding to the first entity in a screen area 1120.

By generating an input that requests to apply an interaction with the second entity to the first entity, the user may personalize a screen by changing the screen provided by the electronic device from the screen area 1110 to the screen area 1120.

Figure 12:
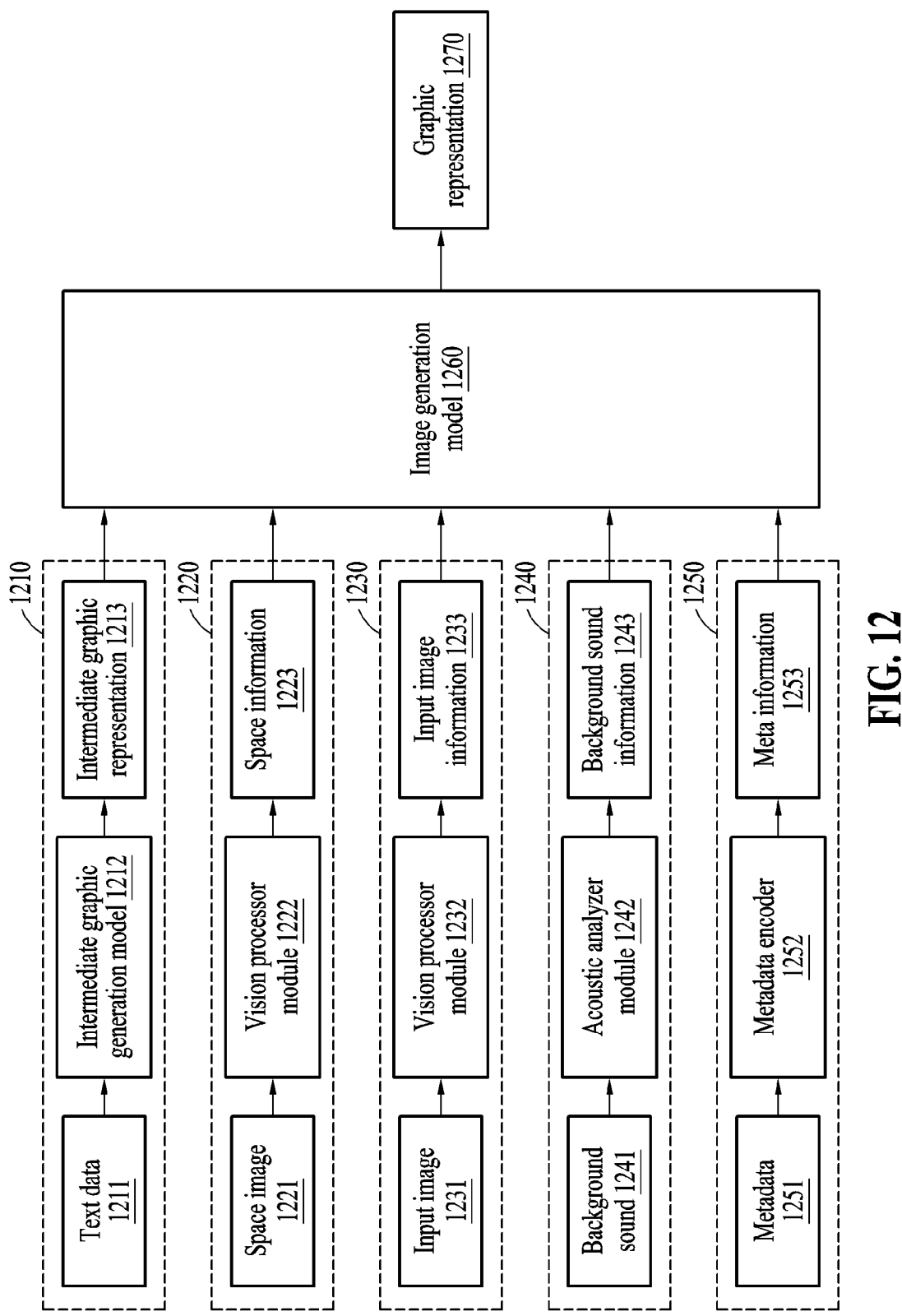
FIG. 12 is a diagram illustrating an example operation of generating a graphic representation corresponding to a second entity according to various embodiments.

FIG. 12 is a diagram illustrating an example operation of generating a graphic representation corresponding to a second entity according to various embodiments.

A graphic representation 1270 corresponding to a second entity may be generated based on a voice input received from a user. As described above with reference to FIGS. 7 and 9, a graphic representation may be generated based on, for example, at least one of a voice input of a user, a space image, an input image, a background sound, or metadata.

According to an example embodiment, the graphic representation 1270 may be generated based on an image generation model 1260. For example, the image generation model 1260 may refer, for example, to a machine learning model that is trained to output the graphic representation 1270 by being applied to input data. The input data may include at least one of an intermediate graphic representation 1213, space information 1223, input image information 1233, background sound information 1243, or meta information 1253.

In operation 1210, an electronic device may obtain the graphic representation 1270 generated as the image generation model 1260 is applied to the intermediate graphic representation 1213. The intermediate graphic representation 1213 may be based on text data 1211 converted from the received voice input and may correspond to the second entity.

According to an example embodiment, a server may obtain the intermediate graphic representation 1213 corresponding to the second entity, based on the text data 1211 converted from the received voice input. The intermediate graphic representation 1213 may be a graphic representation generated based on the voice input of the user and may be independent of (or irrelevant to) a space image 1221, an input image 1231, a background sound 1241, and metadata 1251. The server may generate the graphic representation 1270 by applying the image generation model 1260 to the obtained intermediate graphic representation 1213.

According to an example embodiment, the server may obtain the intermediate graphic representation 1213 by applying an intermediate graphic generation model 1212 to the text data 1211 of the voice input. The intermediate graphic generation model 1212 may include, for example, a machine learning model that is trained to output a graphic representation of text data by being applied to the text data. The graphic representation of the text data may be, for example, a requested graphic representation when the text data requests the generation of the graphic representation.

In operation 1220, the electronic device may obtain the graphic representation 1270 based on the space information 1223 and having a feature of a surrounding space. The space information 1223, which is information representing the feature of the surrounding space of the user, may be based on the space image 1221 including the surrounding space of the user. The space image 1221 may be an image including the surrounding space of the user. The feature of the surrounding space may, for example, refer to a common feature of images captured in the surrounding space of the user. For example, the feature of the surrounding space may include, for example, a feature (e.g., illuminance, a color of a light source, or the like) of an environment in which an image is captured or a texture of the image by the environment (e.g., fog and smoke) in which the image is captured.

According to an example embodiment, the server may calculate the space information 1223 representing the feature of the surrounding space based on the space image 1221 including the surrounding space of the user. For example, the server may obtain the space information 1223 from the space image 1221 using a vision processor module 1222 (e.g., the vision processor module 703 of FIG. 7). For example, the vision processor module 1222 may calculate the space information 1223 by applying the machine learning model to the space image 1221.

The server may generate the graphic representation 1270 corresponding to the second entity, based further on the calculated space information 1223 together with the received voice input, with the feature of the surrounding space. For example, the server may calculate the graphic representation 1270 by applying the image generation model 1260 to the intermediate graphic representation 1213 and the space information 1223. An example graphic representation based on the space information 1223 will be described in detail below with reference to FIG. 13.

For example, when the light source of the surrounding space of the user is a white light, the space information 1223 may represent the white light. Based on the space information 1223 representing the white light, a graphic representation having a feature of an image captured when the light source is white light may be generated.

In operation 1230, the electronic device may obtain the graphic representation 1270 changed such that an area corresponding to the second entity of the input image 1231 has a feature requested by the received voice input. The input image 1231 may include an image having the area corresponding to the second entity.

According to an example embodiment, the server may obtain the input image 1231 having the area corresponding to the second entity from the user.

For example, the input image 1231 may be an image obtained through a camera module (e.g., the camera module 180 of FIG. 1) of the electronic device worn by the user. For example, the input image 1231 may be an image selected based on a user input from among one or more candidate images presented to the user.

The server may generate a graphic representation having a feature requested by the received voice input by changing the area corresponding to the second entity of the input image 1231 to have the feature requested by the received voice input. According to an example embodiment, the server may obtain the input image information 1233 from the input image 1231, using a vision processor module 1232 (e.g., the vision processor module 703 of FIG. 7). For example, the vision processor module 1232 may calculate the input image information 1233 by applying a machine learning model to the input image 1231. The server may generate the graphic representation corresponding to the second entity, based further on the calculated input image information 1233 together with the received voice input, with the feature requested by the voice input. For example, the server may calculate the graphic representation 1270 by applying the image generation model 1260 to the intermediate graphic representation 1213 and the input image information 1233.

For example, a voice input corresponding to a user's utterance "Change to the dog with sunglasses in the image of my dog I gave" may be obtained. Through an analysis of the voice input, the first entity and the second entity may be determined as a robot cleaner and the dog, respectively, and a requested feature (e.g., with sunglasses on) may also be determined. In this example, the graphic representation 1270 of the dog with the sunglasses may be generated.

In operation 1240, the electronic device may obtain the graphic representation 1270 having a visual feature mapped to a feature of the background sound 1241 of the surrounding space. The graphic representation 1270 having the visual feature mapped to the feature of the background sound 1241 may be based on the background sound information 1243. The background sound 1241, which is a sound generated in the surrounding space of the user, may be distinguished from a voice of the user.

According to an example embodiment, the server may calculate the background sound information 1243 representing the feature of the background sound 1241 of the surrounding space that is distinguished from the voice of the user, based on the sound data received from the electronic device.

According to an example embodiment, the server may obtain the background sound information 1243 from the background sound 1241, using an acoustic analyzer module 1242 (e.g., the acoustic analyzer module 701b of FIG. 7). For example, the acoustic analyzer module 1242 may calculate the background sound information 1243 by applying the machine learning model to the background sound 1241.

The server may generate a graphic representation having the visual feature (e.g., a feature of an image) mapped to the feature of the background sound 1241 of the surrounding space, based further on the calculated background sound information 1243 together with the voice input. For example, the server may generate the graphic representation 1270 by applying the image generation model 1260 to the intermediate graphic representation 1213 and the background sound information 1243.

For example, sound data having a voice input corresponding to a user's utterance "Change the robot cleaner to a dog" and a background sound 1241 of classical music may be received. Through an analysis of the sound data, the first entity and the second entity may be determined to be the robot cleaner and the dog, respectively, and a visual feature (e.g., texture corresponding to an oil painting) mapped to a feature (e.g., the classical music) of the background sound 1241 may also be determined. In this example, the graphic representation 1270 corresponding to the second entity that has the texture corresponding to an oil painting may be generated.

In operation 1250, the electronic device may obtain the graphic representation 1270 based on the meta information 1253. The meta information 1253 may be obtained based on the metadata 1251. For example, the metadata 1251 may be at least one of weather data, time data, or geographic data. The meta information 1253 may represent a feature based on the metadata 1251.

According to an example embodiment, the server may calculate the meta information 1253 based on the metadata 1251. For example, the server may calculate the meta information 1253 by applying a metadata encoder 1252 to the metadata 1251. The metadata encoder 1252 may include, for example, a machine learning model trained to output the meta information 1253 by being applied to the metadata 1251.

The server may generate a graphic representation corresponding to the second entity, based further on the calculated meta information 1253 together with the voice input, with the feature based on the metadata 1251. For example, the server may calculate the graphic representation 1270 by applying the image generation model 1260 to the intermediate graphic representation 1213 and the meta information 1253.

Although generating the graphic representation 1270 is mainly described as being performed by the server, the disclosure is not limited in this respect, and some or all of operations of generating the graphic representation 1270 (e.g., operations 1210, 1220, 1230, 1240, and 1250) may be performed, for example, by the electronic device.

For example, in operation 1210, the electronic device may obtain the intermediate graphic representation 1213 corresponding to the second entity based on the text data 1211 converted from an obtained voice input. The electronic device may obtain the intermediate graphic representation 1213 by applying the intermediate graphic generation model 1212 to the text data 1211 of the voice input. The electronic device may generate the graphic representation 1270 by applying the image generation model 1260 to the obtained intermediate graphic representation 1213.

For example, in operation 1220, the electronic device may calculate the space information 1223 representing the feature of the surrounding space of the user based on the space image 1221 including the surrounding space of the user. The electronic device may obtain the space information 1223 from the space image 1221, using the vision processor module 1222 (e.g., the vision processor module 903 of FIG. 9). The electronic device may generate the graphic representation 1270 corresponding to the second entity, based further on the calculated space information 1223 together with the received voice input, with the feature of the surrounding space. The electronic device may calculate the graphic representation 1270 by applying the image generation model 1260 to the intermediate graphic representation 1213 and the space information 1223.

For example, in operation 1230, the electronic device may obtain, from the user, the input image 1231 including the area corresponding to the second entity. The electronic device may generate the graphic representation having a feature requested by the obtained voice input by changing the area corresponding to the second entity of the input image 1231 to have the feature requested by the obtained voice input. The electronic device may obtain the input image information 1233 from the input image 1231, using the vision processor module 1232 (e.g., the vision processor module 903 of FIG. 9). The electronic device may generate a graphic representation corresponding to the second entity, based further on the calculated input image information 1233 together with the received voice input, with the feature requested by the voice input. The electronic device may calculate the graphic representation 1270 by applying the image generation model 1260 to the intermediate graphic representation 1213 and the input image information 1233.

For example, in operation 1240, the electronic device may calculate the background sound information 1243 representing the feature of the background sound 1241 of the surrounding space that is distinguished from the voice of the user, based on sound data obtained through an input module (e.g., a microphone). The electronic device may obtain the background sound information 1243 from the background sound 1241, using the acoustic analyzer module 1242 (e.g., the acoustic analyzer module 901b of FIG. 9). The electronic device may generate a graphic representation having the visual feature (e.g., a feature of an image) mapped to a feature of the background sound 1241 of the surrounding space, based further on the calculated background sound information 1243 together with the voice input. The electronic device may generate the graphic representation 1270 by applying the image generation model 1260 to the intermediate graphic representation 1213 and the background sound information 1243.

For example, in operation 1250, the electronic device may calculate the meta information 1253 based on the metadata 1251. The electronic device may calculate the meta information 1253 by applying the metadata encoder 1252 to the metadata 1251. The electronic device may generate a graphic representation corresponding to the second entity, based further on the calculated meta information 1253 together with the voice input, with the feature based on the metadata 1251. For example, the electronic device may calculate the graphic representation 1270 by applying the image generation model 1260 to the intermediate graphic representation 1213 and the meta information 1253.

Figure 13:
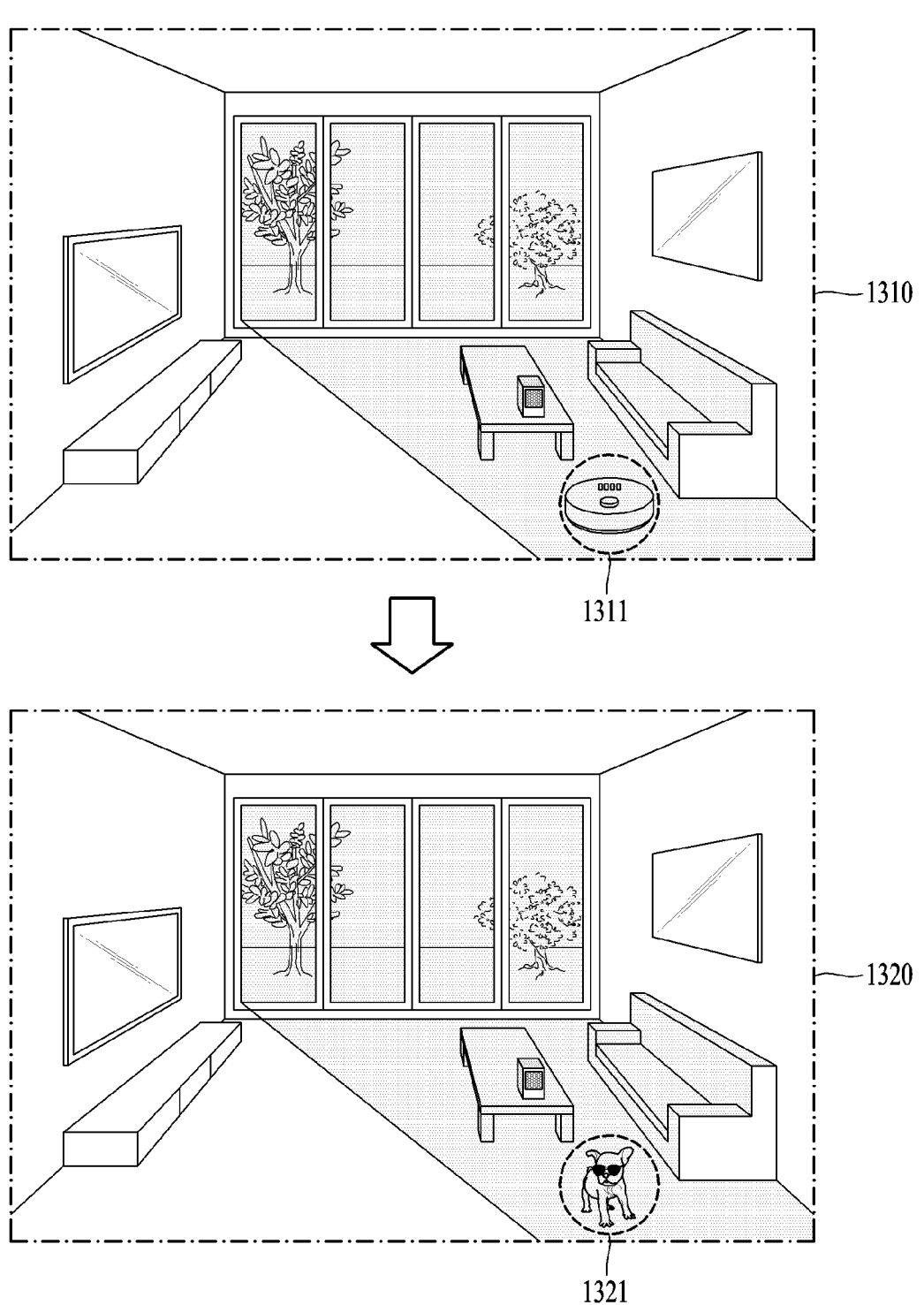
FIG. 13 is a diagram illustrating an example graphic representation having features of a surrounding space around a user according to various embodiments.

FIG. 13 is a diagram illustrating an example graphic representation having features of a surrounding space around a user according to various embodiments.

An electronic device (e.g., the electronic device 101 of FIG. 1, the electronic device 201 of FIG. 2, the electronic device 301 of FIG. 3, the electronic device 401 of FIGS. 4A and 4B, the electronic device 501 of FIG. 5, the electronic device 710 of FIG. 7, or the electronic device 900 of FIG. 9) may provide a user with a shape of a first entity in an area 1311 corresponding to the first entity in a screen area 1310.

A voice input that requests to apply an interaction with a second entity (e.g., a dog) to the first entity (e.g., a robot cleaner) may be received. A space image (e.g., the space image 1221 of FIG. 12) including a surrounding space around the user may be obtained. Based on the space image, space information (e.g., the space information 1223 of FIG. 12) representing a feature of the surrounding space of the user may be obtained. A graphic representation corresponding to the second entity (e.g., the dog) may be generated with the feature of the surrounding space of the user based on the space information.

For example, as shown in FIG. 13, the user may look at the first entity (or an external device corresponding to the first entity) in an environment where sunset light from the sunset enters from outside a window. In this example, a space image captured in such an environment where the sunset light comes in may be received. Based on the space image, space information representing, for example, a feature of the sunset light, and illuminance and/or color of the sunset light, may be calculated. Based on the calculated space information, a graphic representation 1321 corresponding to the dog having the feature of the sunset light may be generated. For example, the graphic representation 1321 may have a feature of the image captured in the environment wherein the sunset light comes in.

The electronic device may display the graphic representation 1321 corresponding to the second entity on the screen area 1311 corresponding to the first entity in a screen area 1320.

According to an example embodiment, when displaying the first entity by applying an interaction with the second entity to the first entity, a graphic representation having a feature of the surrounding space of the user may be displayed, and thus an unartificial screen with less sense of difference between the surrounding space of the user and the graphic representation may be provided to the user.

Figure 14:
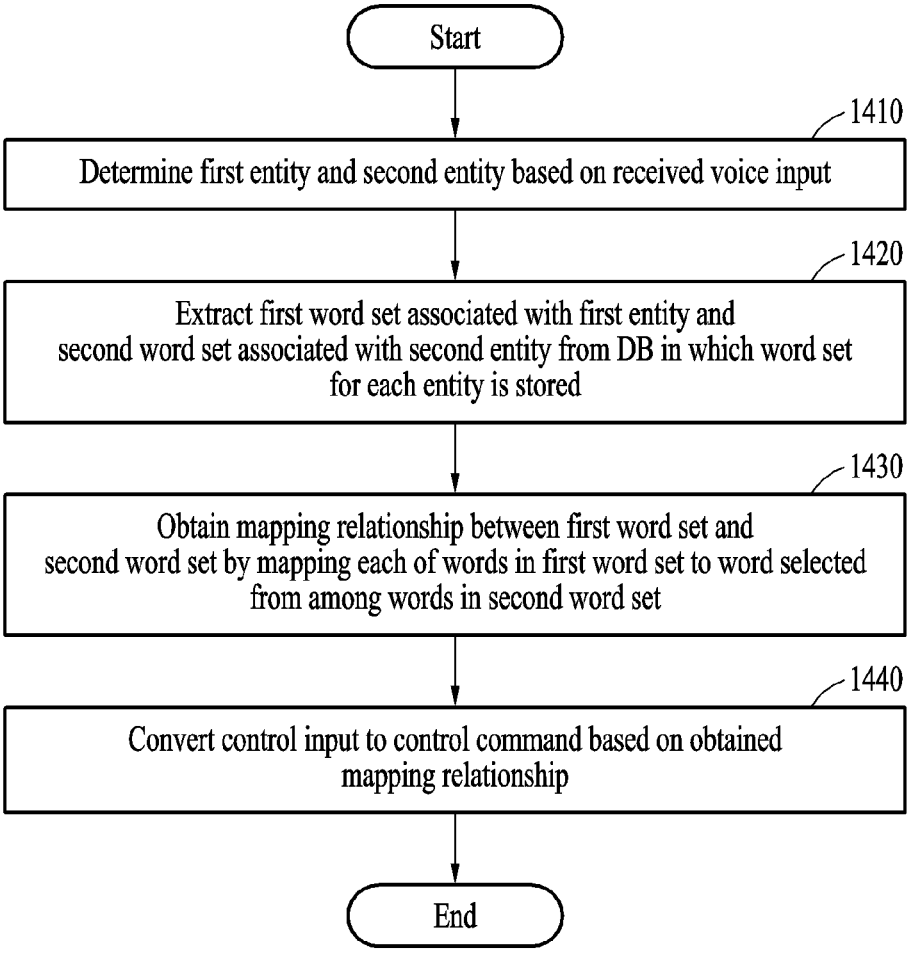
FIG. 14 is a diagram illustrating an example flow of operations performed by a server to obtain a mapping relationship between word sets according to various embodiments.

FIG. 14 is a diagram illustrating an example flow of operations performed by a server to obtain a mapping relationship between word sets according to various embodiments.

A voice input of a user that requests to apply an interaction with a second entity to a first entity may be obtained. A mapping relationship between a first word set associated with the first entity and a second word set associated with the second entity may be obtained based on the obtained voice input. An electronic device may transmit, to an external device, a control command converted from a control input for the second entity based on the mapping relationship.

In operation 1410, a server may determine a first entity and a second entity based on a received voice input.

According to an example embodiment, the server may determine the first entity and the second entity based on the voice input and an input image received from the electronic device. For example, the server may determine the first entity and the second entity based on at least one of the voice input or the input image, respectively. For example, the server may determine the first entity based on the voice input and the second entity based on the input image. For example, the server may determine the first entity based on the voice input and the second entity based on the voice input and the input image.

However, determining the first entity and the second entity is not limited to being performed by the server, and may be performed by the electronic device. According to an example embodiment, the electronic device may determine the first entity and the second entity based on the voice input. For example, the electronic device may determine the first entity and the second entity based on the voice input and the input image obtained through an input module. For example, the electronic device may determine the first entity and the second entity based on at least one of the voice input or the input image, respectively. For example, the electronic device may determine the first entity based on the voice input and the second entity based on the input image.

In operation 1420, the server may extract a first word set associated with the first entity and a second word set associated with the second entity from a DB. The server may extract the first word set and the second word set from the DB based on the determined first entity and the determined second entity. The DB may include a DB (e.g., the commonsense DB 707 of FIG. 7 or the commonsense DB 907 of FIG. 9) in which a word set for each of a plurality of entities is stored. A word set associated with an entity may, for example, include words about at least one of a state, a function, or an operation of the entity. The DB may store the first word set associated with the first entity and the second word set associated with the second entity.

However, extracting the first word set and the second word set is not limited to being performed by the server, and may be performed by the electronic device. According to an example embodiment, the electronic device may extract, from the DB, the first word set associated with the first entity and the second word set associated with the second entity. The electronic device may extract the first word set and the second word set from the DB based on the determined first entity and the determined second entity.

In operation 1430, the server may obtain a mapping relationship between the first word set and the second word set by mapping each of words in the first word set to a word selected from among words in the second word set. The mapping relationship between the first word set and the second word set may represent, for example, information indicating that each word of the first word set indicates a mapped word among the words of the second word set.

According to an example embodiment, the server may obtain the mapping relationship between the first word set and the second word set based on similarities between the words of the first word set and the words of the second word set. For example, the server may calculate a similarity between each word in the first word set and each word in the second word set. For example, the server may calculate the similarity using a pre-trained machine learning model. The machine learning model may include a machine learning model that is trained in advance to calculate a representation vector corresponding to a feature of an input word by being applied to the input word. By applying the machine learning model to each of the words of the first word set and the words of the second word set, a representation vector of a corresponding word may be calculated. For example, as a similarity between a first word and a second word, a similarity (e.g., a dot product) between a representation vector of the first word and a representation vector of the second word may be calculated.

For each of the words in the first word set, a word in the second word set having the maximum similarity with the corresponding word in the first word set may be selected. The word in the first word set may be mapped to the selected word in the second word set. For the words of the first word set, selecting words of the second word set and mapping to the selected words may be performed iteratively, and the mapping relationship between the first word set and the second word set may thereby be obtained.

However, the mapping relationship is not limited to being obtained by the server, and may be obtained by the electronic device. The electronic device may obtain the mapping relationship between the first word set and the second word set by mapping each word in the first word set to a selected word in the second word set. The electronic device may obtain the mapping relationship between the first word set and the second word set based on similarities between the words in the first word set and the words in the second word set. The electronic device may calculate a similarity between each word in the first word set and each word in the second word set. For example, the electronic device may calculate the similarity using a pre-trained machine learning model.

In operation 1440, the server may convert a control input into a control command based on the mapping relationship between the first word set and the second word set.

According to an example embodiment, the server may detect a word associated with the second entity from the control input for the second entity. The server may obtain a word associated with the first entity mapped to the detected word associated with the second entity based on the mapping relationship. The server may determine an operation of an external device corresponding to the first entity indicated by the word associated with the first entity. The server may convert the control input into the control command by generating the control command that triggers the determined operation of the external device corresponding to the first entity.

However, converting the control input is not limited to being performed by the server but may also be performed by the electronic device. According to an example embodiment, the electronic device may convert the control input into the control command based on the mapping relationship between the first word set and the second word set. For example, the electronic device may detect a word associated with the second entity from the control input for the second entity. Based on the mapping relationship, the electronic device may obtain a word associated with the first entity that is mapped to the detected word associated with the second entity. The electronic device may determine an operation of the external device corresponding to the first entity indicated by the word associated with the first entity. The electronic device may convert the control input into the control command by generating the control command that triggers the determined operation of the external device corresponding to the first entity.

Figure 15:
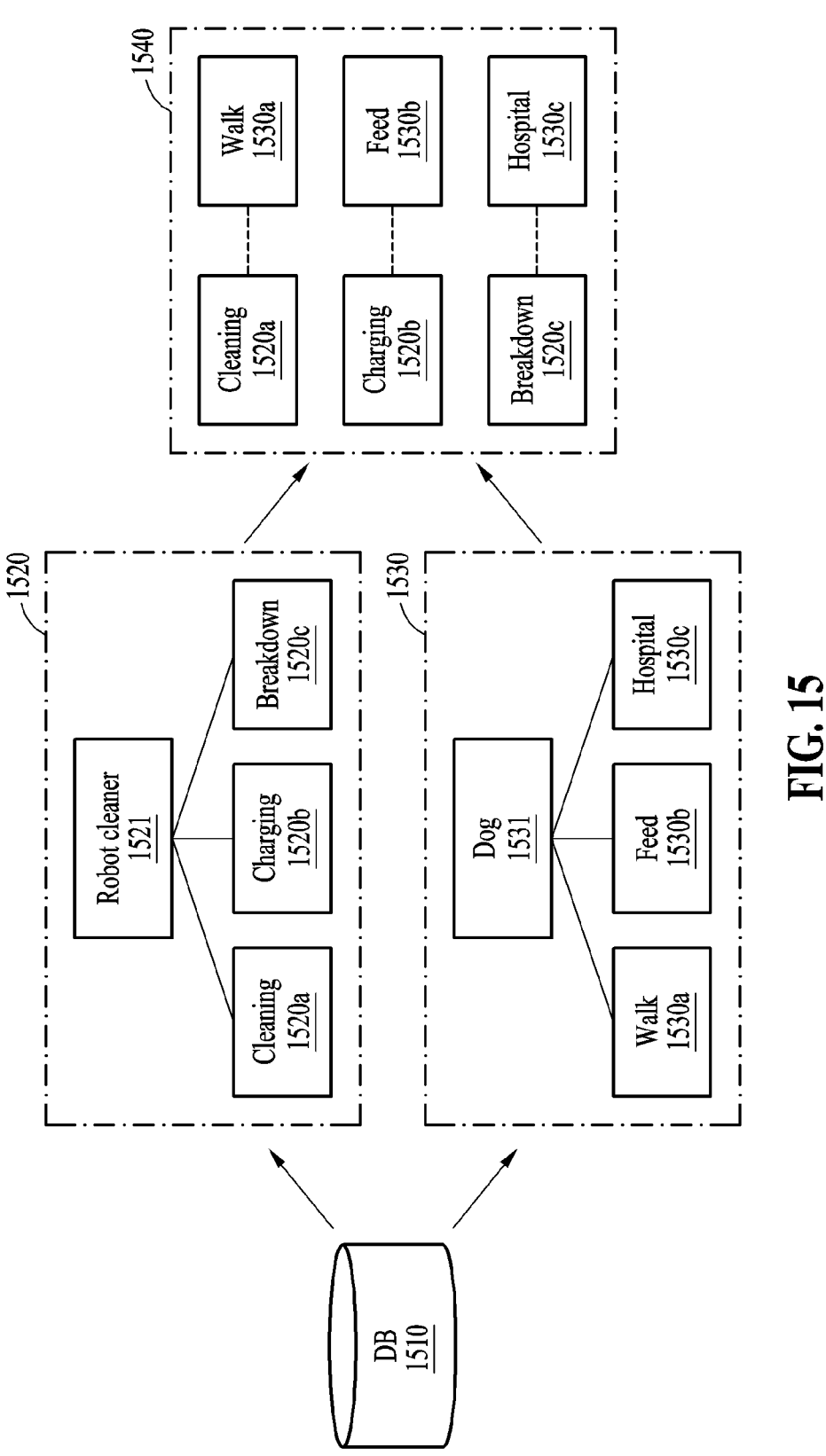
FIG. 15 is a diagram illustrating an example of obtaining a mapping relationship between a first word set and a second word set according to various embodiments.

FIG. 15 is a diagram illustrating an example of obtaining a mapping relationship between a first word set and a second word set according to various embodiments.

A voice input of a user that requests to apply an interaction with a second entity to a first entity may be received. For example, the voice input corresponding to a user's utterance "Change the robot cleaner to a dog" may be received. Based on the received voice input, the first entity and the second entity may be determined as the robot cleaner and the dog, respectively.

As shown in FIG. 15, from a DB 1510 (e.g., the commonsense DB 707 of FIG. 7), a first word set 1520 associated with a robot cleaner 1521 that is the first entity and a second word set 1530 associated with a dog 1531 that is the second entity may be extracted. The first word set 1520 associated with the first entity may include a first word 1520a (e.g., "cleaning"), a second word 1520b (e.g., "charging"), and a third word 1520c (e.g., "breakdown"). The second word set 1530 associated with the second entity may include a fourth word 1530a (e.g., "walk"), a fifth word 1530b (e.g., "feed"), and a sixth word 1530c (e.g., "hospital").

A mapping relationship 1540 between the first word set 1520 associated with the first entity and the second word set 1530 associated with the second entity may be obtained. A similarity between each word in the first word set 1520 and each word in the second word set 1530 may be calculated. For example, a similarity between the first word 1520a (e.g., "cleaning") in the first word set 1520 and each of the words 1530a, 1530b, and 1530c (e.g., "walk," "feed," and "hospital") in the second word set 1530 may be calculated. In this example, the similarity between the first word 1520a (e.g., "cleaning") and the fourth word 1530a (e.g., "walk") may be calculated as 0.86. The similarity between the first word 1520a (e.g., "cleaning") and the fifth word 1530b (e.g., "feed") may be calculated as 0.04. The similarity between the first word 1520a (e.g., "cleaning") and the sixth word 1530c (e.g., "hospital") may be calculated as 0.15. The first word 1520a (e.g., "cleaning") may be mapped to the fourth word 1530a (e.g., "walk") among the words 1530a, 1530b, and 1530c in the second word set 1530. Similarly, the second word 1520b (e.g., "charging") may be mapped to the fifth word 1530b (e.g., "feed"). Also, the third word 1520c (e.g., "breakdown") may be mapped to the sixth word 1530c (e.g., "hospital").

Figure 16:
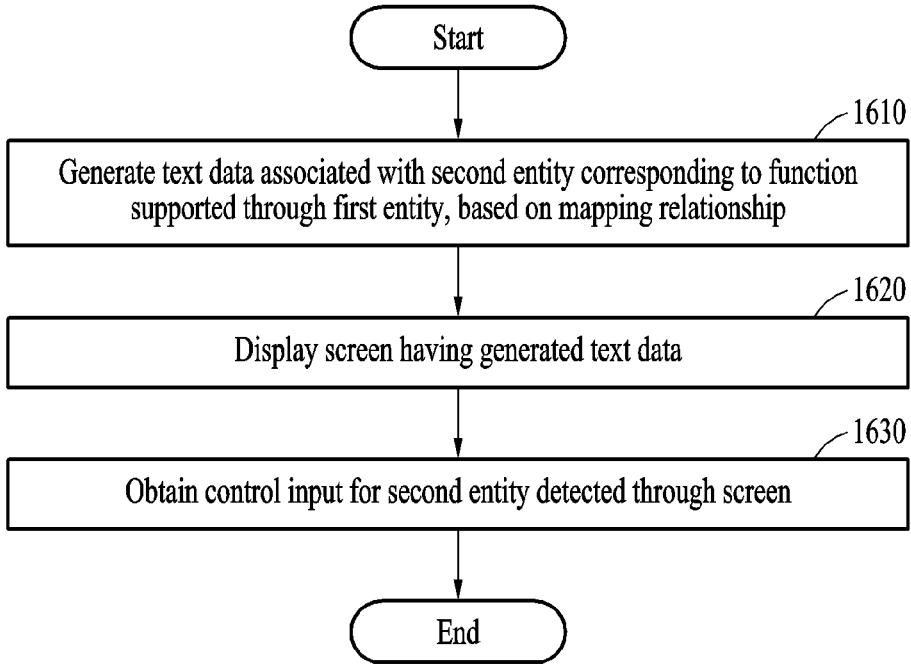
FIG. 16 is a diagram illustrating an example flow of operations performed by an electronic device to display a screen having text data about a second entity according to various embodiments.

FIG. 16 is a diagram illustrating an example flow of operations performed by an electronic device to display a screen having text data about a second entity according to various embodiments.

According to an example embodiment, a voice input of a user that requests to apply an interaction with a second entity to a first entity may be obtained. An electronic device may display a screen having text data about the second entity. The text data about the second entity may correspond to a function supported through the first entity. The text data about the second entity may be generated based on a mapping relationship between a first word set associated with the first entity and a second word set associated with the second entity. The electronic device may obtain a control input for the second entity through the screen having the text data about the second entity.

In operation 1610, a server (e.g., the server 108 of FIG. 1 or the server 700 of FIG. 7) may generate text data about a second entity corresponding to each of functions supported by a first entity, based on a mapping relationship between a first word set associated with the first entity and a second word set associated with the second entity.

According to an example embodiment, the server may extract first text data about the first entity from a screen for the first entity. The screen for the first entity may, for example, be a screen for an interaction between the first entity and a user and may include, for example, a screen for detecting a control input of the user for the first entity and/or a screen for displaying feedback on the first entity to the user. The first text data may include text data representing at least one of the functions supported by the first entity. The server may convert the first text data into second text data about the second entity, using a text generator module (e.g., the text generator module 705 of FIG. 7). The second text data may include text data about the second entity corresponding to a function of the first entity represented by the first text data. For example, the text data about the second entity corresponding to the function of the first entity may represent at least one of a function, a state, or an operation of the second entity indicated by a second word associated with the second entity to which a first word associated with the function of the first entity is mapped. For example, the text generator module of the server may generate the second text data by converting the first text data about the first entity into the second text data about the second entity.

However, generating the text data about the second entity is not limited to being performed by the server, but may be performed by the electronic device (e.g., the electronic device 101 of FIG. 1, the electronic device 201 of FIG. 2, the electronic device 301 of FIG. 3, the electronic device 401 of FIGS. 4A and 4B, the electronic device 501 of FIG. 5, the electronic device 710 of FIG. 7, or the electronic device 900 of FIG. 9). According to an example embodiment, the electronic device may generate text data about the second entity corresponding to each of the functions supported by the first entity, based on the mapping relationship between the first word set associated with the first entity and the second word set associated with the second entity. The electronic device may extract the first text data about the first entity from the screen for the first entity. The electronic device may convert the first text data into the second text data about the second entity, using a text generator module (e.g., the text generator module 905 of FIG. 9). For example, the text generator module of the electronic device may generate the second text data by converting the first text data about the first entity into the second text data about the second entity.

In operation 1620, the electronic device may display a screen having the text data. The screen having the text data about the second entity may be generated. The electronic device may display the generated screen.

According to an example embodiment, the server may generate the screen having the generated text data about the second entity. The server may transmit a display command for displaying the generated screen to the electronic device.

For example, the server may generate the screen having the text data about the second entity by converting the text data of the screen for the first entity into the text data about the second entity. When the first text data is converted and the second text data is generated, the first text data may be converted into the second text data.

For example, the server may generate a screen having both text about the first entity and text about the second entity by adding the text data about the second entity to the screen for the first entity. By providing the text about the first entity together with the text about the second entity to the user, it is possible to provide a screen that is easy for users who are not familiar with applying an interaction with the second entity to the first entity.

Based on receiving the display command for displaying the screen having the text data about the second entity from the server, the electronic device may display the screen having the text data about the second entity. For example, based on receiving the display command for displaying the generated screen from the server, the electronic device may display the generated screen on a screen area corresponding to the first entity (or an area corresponding to a graphic representation corresponding to the second entity).

However, generating the screen having the text data about the second entity is not limited to being performed by the server but may be performed by the electronic device. According to an example embodiment, the electronic device may generate the screen having the generated text data about the second entity. For example, the electronic device may generate the screen having the text data about the second entity by converting the text data of the screen for the first entity into the text data about the second entity. For example, the electronic device may generate a screen having both the text about the first entity and the text about the second entity by adding the text data about the second entity to the screen for the first entity. The electronic device may display the generated screen having the text about the second entity on the screen area corresponding to the first entity.

In operation 1630, a control input for the second entity detected through the screen having the text about the second entity may be obtained.

According to an example embodiment, the server may receive, from the electronic device, a control input for the second entity detected through the screen. For example, the electronic device may display a screen for detecting the control input for the second entity. The electronic device may detect the control input of the user for the second entity through the screen. Based on detecting the control input for the second entity, the electronic device may transmit the control input for the second entity to the server. The server may receive the control input for the second entity from the electronic device. As described above with reference to FIG. 10, based on receiving the control input for the second entity, the server may convert the control input into a control command that triggers an operation of an external device corresponding to the first entity, and transmit it to the external device corresponding to the first entity.

However, in an example embodiment in which the control input for the second entity is converted into the control command for the first entity by the electronic device, the electronic device may also obtain the control input for the second entity. According to this example embodiment, the electronic device may obtain the control input for the second entity detected through the screen having the text about the second entity. As described above with reference to FIG. 10, the electronic device may convert the control input for the second entity into the control command for the external device corresponding to the first entity and transmit the control command to the external device corresponding to the first entity.

Figure 17:
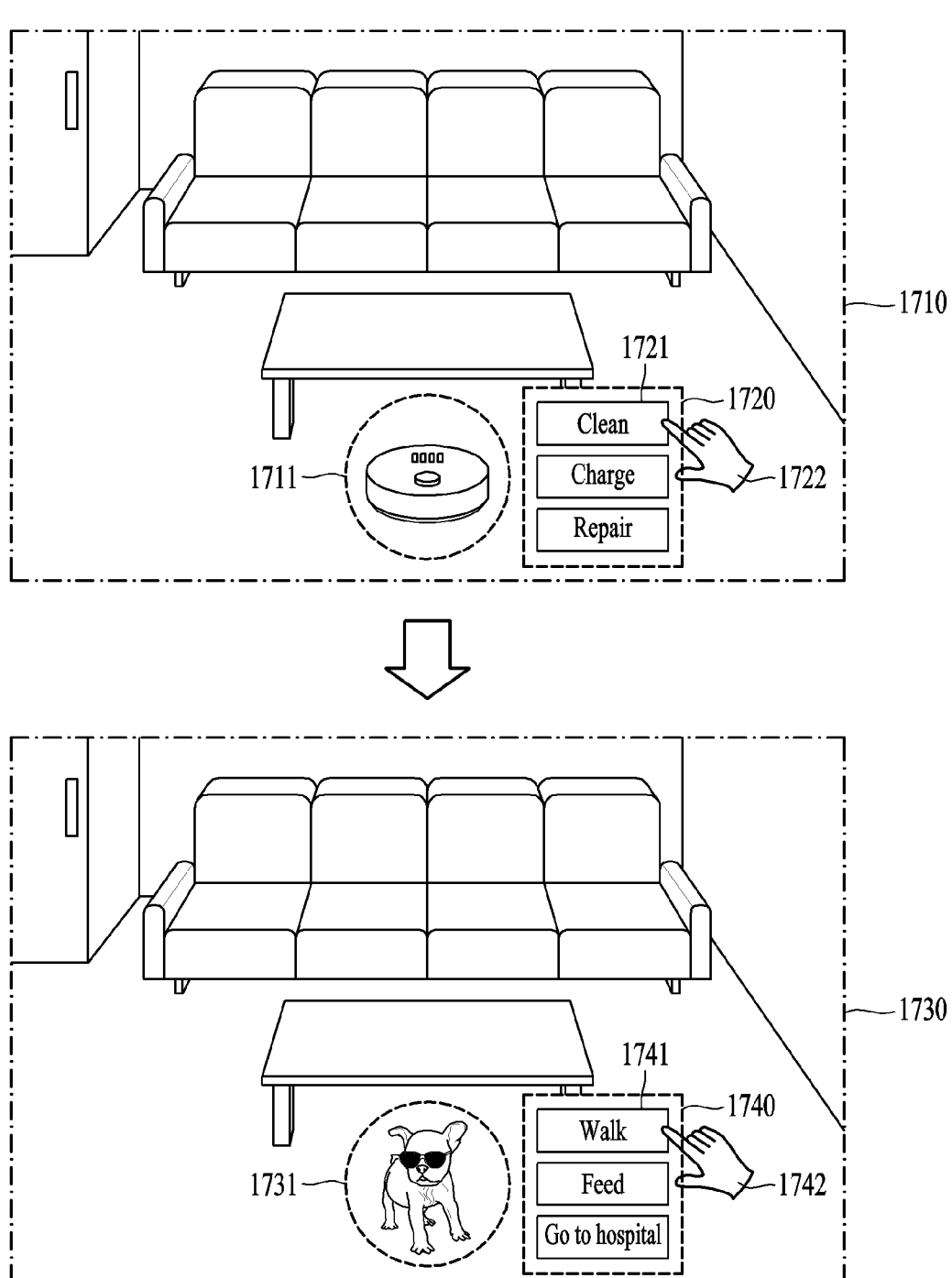
FIG. 17 is a diagram illustrating an example screen having text data about a second entity displayed by an electronic device according to various embodiments.

FIG. 17 is a diagram illustrating an example screen having text data about a second entity displayed by an electronic device according to various embodiments.

An electronic device (e.g., the electronic device 101 of FIG. 1, the electronic device 201 of FIG. 2, the electronic device 301 of FIG. 3, the electronic device 401 of FIGS. 4A and 4B, the electronic device 501 of FIG. 5, the electronic device 710 of FIG. 7, or the electronic device 900 of FIG. 9) may provide a user with a shape of a first entity in a screen area 1711 corresponding to the first entity. For example, the user of the electronic device (e.g., an OST device) may visually recognize the first entity (e.g., a robot cleaner) in the screen area 1711 in a screen area 1710 corresponding to the first entity. For example, the electronic device (e.g., a VST device) may display the first entity (e.g., the robot cleaner) in the screen area 1711 of the screen area 1710 corresponding to the first entity.

The electronic device may display a screen 1720 for the first entity through a display. For example, as shown in FIG. 17, the electronic device may display the screen 1720 for the first entity in a partial area of the screen area 1710. For example, the screen 1720 for the first entity may include a screen for detecting a control input for the first entity. The screen 1720 may have text data (e.g., "clean," "charge," and "repair") corresponding to functions (e.g., start cleaning, start charging, and display information about repairing a breakdown) supported by the first entity. For example, when the electronic device detects a control input 1722 of the user for a first function (e.g., start cleaning) of the first entity, the electronic device may transmit the control input to the server to transmit a control command to an external device corresponding to the first entity through the server and/or directly transmit the control command to the external device corresponding to the first entity.

When a voice input that requests to apply an interaction with a second entity (e.g., a dog) to the first entity (e.g., the robot cleaner) is obtained, the electronic device may display a graphic representation 1731 corresponding to the second entity on a screen area 1731 corresponding to the first entity in a screen area 1730.

A screen 1740 (e.g., a screen for the second entity) having text data about the second entity may be generated. For example, text data (e.g., "clean," "charge," and "repair") about the first entity may be extracted from the screen 1720 for the first entity. In this example, first text data 1721 may be extracted from the screen 1720 for the first entity. The first text data 1721 (e.g., "clean") may be converted into second text data 1741 (e.g., "walk") associated with the second entity. For example, a first word (e.g., "clean") associated with a function (e.g., "start cleaning") of the first entity indicated by the first text data 1721 (e.g., "clean") may be determined. Based on a mapping relationship between a first word set and a second word set, a second word (e.g., "walk") associated with the second entity to which the determined first word (e.g., "clean") is mapped may be obtained. The second text data 1741 (e.g., "walk") may be generated based on the second word.

The electronic device may display the screen 1740 for the second entity. The screen 1740 for the second entity may include a screen for receiving a control input for the second entity.

For example, the screen 1740 may have sets of text data (e.g., "walk," "feed," and "go to hospital") associated with the second entity. Based on detecting a control input 1742 of the user for the second entity, the electronic device may transmit the control input 1742 to the server, and/or convert the control input 1742 into a control command that triggers an operation of an external device corresponding to the first entity and transmit it to the external device corresponding to the first entity.

According to an example embodiment, when the control input 1742 for the second entity is obtained through the screen 1740 for the second entity, the external device corresponding to the first entity may be controlled in the same way as controlled when the control input 1722 for the first entity is detected through the screen 1720 for the first entity. By applying an interaction with the second entity to the first entity, it is possible to provide the user with a virtual space in which the external device corresponding to the first entity is controllable.

Figure 18:
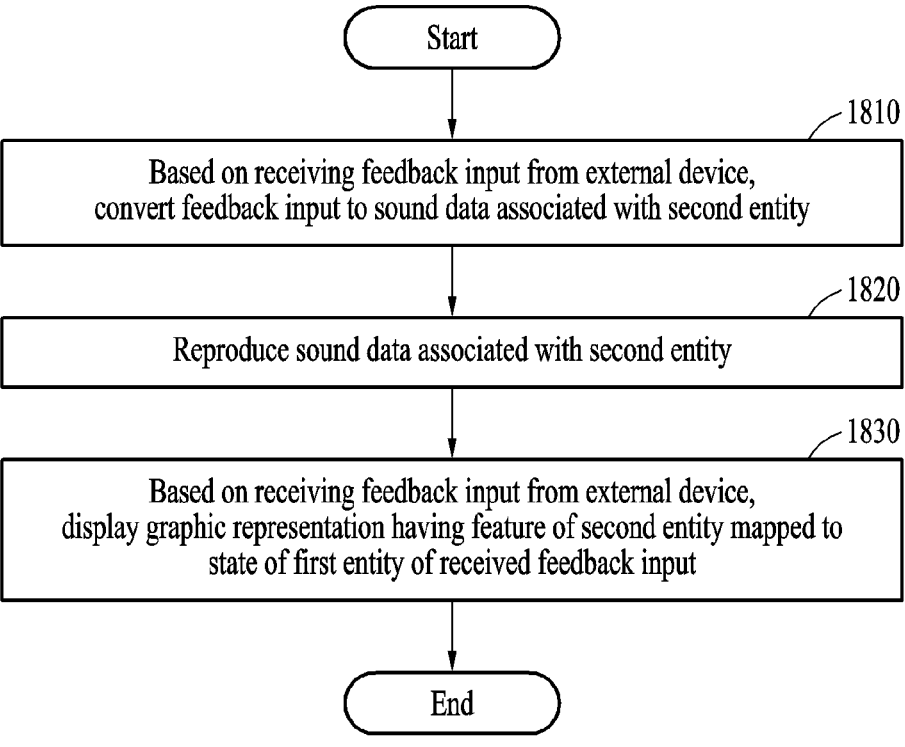
FIG. 18 is a diagram illustrating an example flow of operations performed by a server to provide feedback to a user based on a feedback input from a first entity according to various embodiments.

FIG. 18 is a diagram illustrating an example flow of operations performed by an electronic device to provide feedback to a user based on a feedback input from a first entity according to various embodiments.

According to an example embodiment, based on receiving a feedback input from an external device, the electronic device may reproduce sound data about a second entity converted from the feedback input.

In operation 1810, based on receiving a feedback input from an external device corresponding to a first entity, a server (e.g., the server 108 of FIG. 1 or the server 700 of FIG. 7) may convert the feedback input to sound data about a second entity.

The feedback input may be an input for transferring information about the first entity (or the external device corresponding to the first entity) to a user from the external device corresponding to the first entity, and may include a feedback input indicating a state of the first entity (or the external device corresponding to the first entity) or a feedback input indicating a response to a control command of the user. For example, the external device corresponding to the first entity may periodically transmit a feedback input indicating a state of the first entity (e.g., a battery charging state, an operation being performed by the first entity, and a failure or breakdown state) to the server based on a predetermined period. For example, based on a control input that triggers an operation of the external device corresponding to the first entity from the server or the electronic device (e.g., the electronic device 101 of FIG. 1, the electronic device 201 of FIG. 2, the electronic device 301 of FIG. 3, the electronic device 401 of FIGS. 4A and 4B, the electronic device 501 of FIG. 5, the electronic device 710 of FIG. 7, or the electronic device 900 of FIG. 9), the external device corresponding to the first entity may generate a feedback input indicating a response to the control input. For example, the response to the control input may include, for example, information as to whether the operation of the external device corresponding to the first entity indicated by the control input is to be performed and information about the operation of the external device corresponding to the first entity indicated by the control input.

According to an example embodiment, the server may generate text data about the second entity based on the feedback input. For example, the server may convert the feedback input to the text data about the second entity based on a mapping relationship (e.g., the mapping relationship 1540 of FIG. 15) between a first word set associated with the first entity and a second word set associated with the second entity. According to an example embodiment, the server may generate the text data about the second entity based on the feedback input, using a text generator module (e.g., the text generator module 705 of FIG. 7). The server may obtain sound data about the second entity by converting the generated text data into the sound data. According to an example embodiment, the server may convert the text data about the second entity into the sound data about the second entity, using a TTS module (e.g., the TTS module 702c of FIG. 7).

However, converting the feedback data about the second entity into the sound data about the second entity may not be limited to being performed by the server but may be performed by the electronic device (e.g., the electronic device 101 of FIG. 1, the electronic device 201 of FIG. 2, the electronic device 301 of FIG. 3, the electronic device 401 of FIGS. 4A and 4B, the electronic device 501 of FIG. 5, the electronic device 710 of FIG. 7, or the electronic device 900 of FIG. 9). According to an example embodiment, based on receiving a feedback input from the external device corresponding to the first entity, the electronic device may convert the feedback input into sound data about the second entity. The electronic device may generate text data about the second entity based on the feedback input. Based on a mapping relationship (e.g., the mapping relationship 1540 of FIG. 15) between a first word set associated with the first entity and a second word set associated with the second entity, the electronic device may convert the feedback input into the text data about the second entity. For example, the electronic device may generate the text data about the second entity based on the feedback input, using a text generator module (e.g., the text generator module 905 of FIG. 9). The electronic device may obtain sound data about the second entity by converting the generated text data into the sound data. For example, the electronic device may convert the text data about the second entity into the sound data about the second entity, using a TTS module (e.g., the TTS module 902*c* of FIG. 9).

In operation 1820, the electronic device may reproduce the sound data about the second entity.

According to an example embodiment, converting the feedback input into the sound data about the second entity may be performed by the server. The server may convert the feedback input data into the sound data about the second entity. The server may transmit a command for reproducing the sound data about the second entity to the electronic device. Based on receiving the command for reproducing the sound data about the second entity from the server, the electronic device may reproduce the sound data about the second entity.

According to an example embodiment, converting the feedback input into the sound data about the second entity may be performed by the electronic device. The electronic device may convert the feedback input data into the sound data about the second entity. The electronic device may reproduce the sound data about the second entity.

According to an example embodiment, based on receiving the feedback input from the external device corresponding to the first entity, the electronic device may display a graphic representation having a feature of the second entity mapped to a state of the first entity of the received feedback input.

In operation 1830, based on receiving the feedback input from the external device corresponding to the first entity, the server may generate a graphic representation having a feature of the second entity mapped to a state of the first entity of the received feedback input. The server may receive the feedback input indicating the state of the first entity from the external device corresponding to the first entity. For example, the feedback input may include information about an operation being performed by the external device corresponding to the first entity, for example, a type, strength, and a range of the operation. The server may generate the graphic representation having the feature of the second entity mapped to the state of the first entity based on the feedback input. The state of the first entity may be mapped to the feature of the second entity. For example, the first entity may be a robot cleaner, and the second entity may be a dog. A state in which the robot cleaner is broken may be mapped to a feature of the dog being sick. A state in which the robot cleaner is being charged may be mapped to a feature of the dog eating.

The server may transmit, to the electronic device, a display command for displaying the graphic representation generated in a screen area corresponding to the first entity. Based on receiving the display command from the server, the electronic device may then display the graphic representation (e.g., the graphic representation having the feature of the second entity mapped to the state of the first entity of the feedback input).

However, generating the graphic representation having the feature of the second entity mapped to the state of the first entity of the received feedback input may not be limited to being performed by the server but may be performed by the electronic device (e.g., the electronic device 101 of FIG. 1, the electronic device 201 of FIG. 2, the electronic device 301 of FIG. 3, the electronic device 401 of FIGS. 4A and 4B, the electronic device 501 of FIG. 5, the electronic device 710 of FIG. 7, or the electronic device 900 of FIG. 9). Based on receiving a feedback input from the external device corresponding to the first entity, the electronic device may generate a graphic representation having a feature of the second entity mapped to a state of the first entity of the received feedback input. For example, the electronic device may receive the feedback input indicating the state of the first entity from the external device corresponding to the first entity. Based on the feedback input, the electronic device may generate the graphic representation having the feature of the second entity mapped to the state of the first entity. The electronic device may display the generated graphic representation (e.g., the graphic representation having the feature of the second entity mapped to the state of the first entity of the feedback input). For example, the electronic device may display the generated graphic representation on a screen area corresponding to the first entity in a display module.

According to an example embodiment, feedback from the external device corresponding to the first entity may be converted into feedback from the second entity and transmitted to the user. The server may provide the user with a virtual space in which an interaction between the user and the first entity is converted into an interaction between the user and the second entity.

Figure 19:
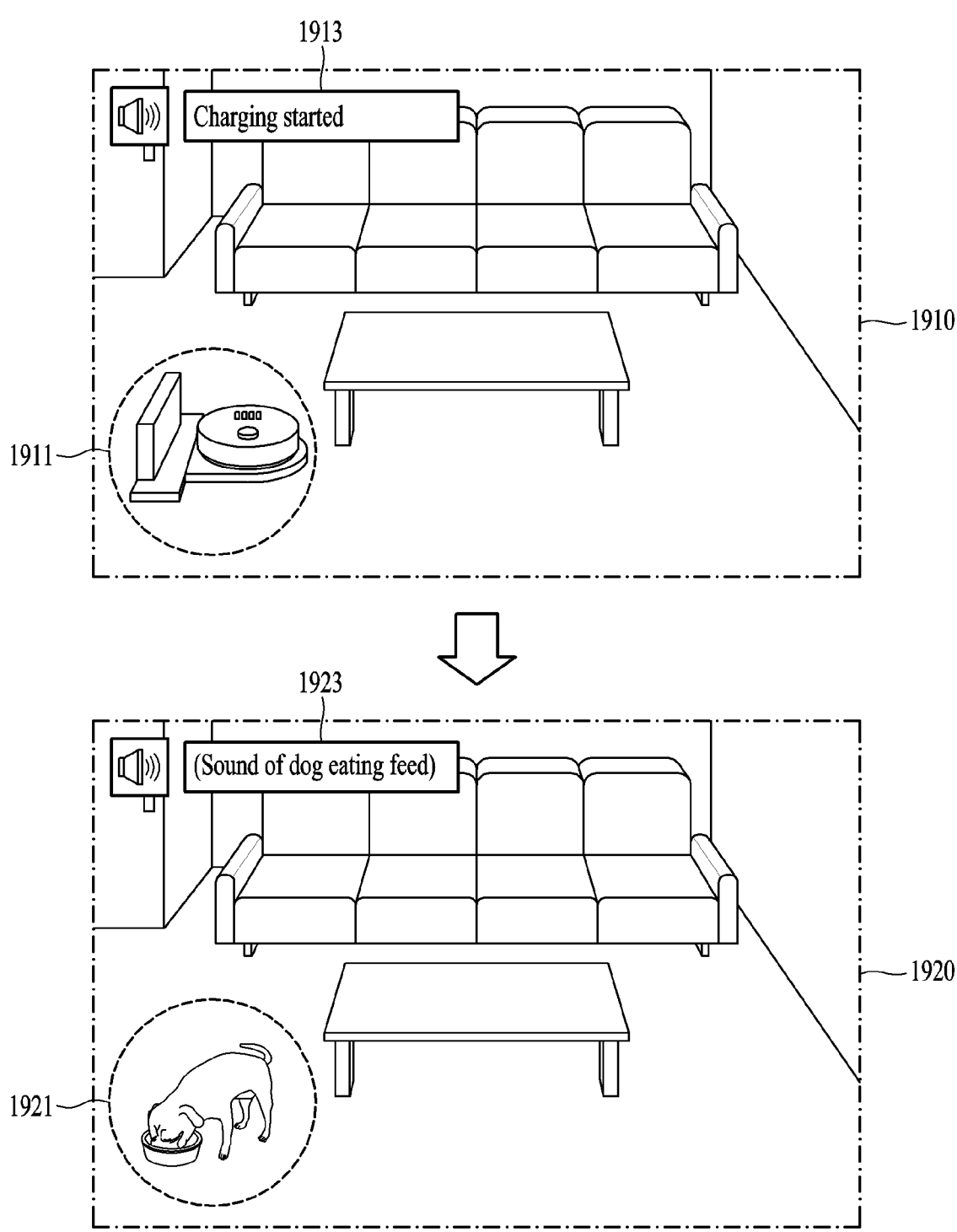
FIG. 19 is a diagram illustrating an example method in which an electronic device displays a graphic representation having a feature of a second entity mapped to a state of a first entity according to various embodiments.

FIG. 19 is a diagram illustrating an example method in which an electronic device displays a graphic representation having a feature of a second entity mapped to a state of a first entity according to various embodiments.

An electronic device (e.g., the electronic device 101 of FIG. 1, the electronic device 201 of FIG. 2, the electronic device 301 of FIG. 3, the electronic device 401 of FIGS. 4A and 4B, the electronic device 501 of FIG. 5, the electronic device 710 of FIG. 7, or the electronic device 900 of FIG. 9) may provide a user with a shape of a first entity in a screen area 1911 corresponding to the first entity. For example, the user of the electronic device (e.g., an OST device) may visually recognize the first entity (e.g., a robot cleaner) through an external device corresponding to the first entity in the screen area 1911 corresponding to the first entity in a screen area 1910. For example, the electronic device (e.g., a VST device) may display the first entity (e.g., the robot cleaner) on the screen area 1911 corresponding to the first entity in the screen area 1910.

The electronic device may reproduce sound data 1913 based on a feedback input of the first entity (or the external device corresponding to the first entity). For example, as shown in FIG. 19, a feedback input indicating a state in which the robot cleaner is being charged may be obtained. Based on the feedback input received from the robot cleaner, the sound data 1913 that is based on a charging state of the robot cleaner may be obtained. The electronic device may reproduce the sound data 1913. The reproduction of sound data about the first entity may notify the user of the state of the first entity.

A voice input requesting to apply an interaction with a second entity (e.g., a dog) to the first entity (e.g., the robot cleaner) may be received. Based on the voice input, the electronic device may change the first entity to a graphic representation corresponding to the second entity and display it. A feedback input indicating a state of the first entity may be received from the external device corresponding to the first entity. For example, as shown in FIG. 19, a feedback input indicating a state in which the robot cleaner is being charged may be received.

According to an example embodiment, when a feedback input is received from the external device corresponding to the first entity, the feedback input may be converted into sound data about the second entity. Based on the feedback input received from the robot cleaner, sound data 1923 about the second entity may be obtained. For example, the feedback input indicating the state in which the robot cleaner is being charged may be converted into the sound data 1923 corresponding to a sound of the dog eating feed. The electronic device may reproduce the sound data 1923. Through the reproduction of the sound data 1923 about the second entity, the state of the first entity may be converted into the sound data about the second entity and transmitted to the user.

According to an example embodiment, when a feedback input is received from the external device corresponding to the first entity, a graphic representation 1921 having a feature of the second entity mapped to the state of the first entity may be generated based on the feedback input. As shown in FIG. 19, the graphic representation 1921 having a feature of the dog mapped to the state of the robot cleaner may be generated. For example, the graphic representation 1921 having a feature of the dog eating feed mapped to the state in which the robot cleaner is being charged may be generated. The electronic device may display the graphic representation 1921 on the screen area 1911 corresponding to the first entity in a screen area 1920.

According to various embodiments described herein, an electronic device may be a device of one of various types. The electronic device may include, as non-limiting examples, a portable communication device (e.g., a smartphone, etc.), a computing device, a portable multimedia device, a portable medical device, a camera, a wearable device, a home appliance, or the like. However, the electronic device is not limited to the examples described above.

It should be appreciated that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B," "at least one of A and B," "at least one of A or B," "A, B, or C," "at least one of A, B, and C," and "A, B, or C," may each include any one of the items listed together in the corresponding one of the phrases, or all possible combinations thereof. Terms such as "first," "second," or "initial" or "next" or "subsequent" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., by wire), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC).

Various embodiments set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to various embodiments, a method according to an example embodiment of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device for controlling an external electronic device, the electronic device comprising:

a display;

memory storing computer-executable instructions; and at least one processor comprising processing circuitry configured to execute the instructions, wherein the instructions, when executed, cause the at least one processor to control the electronic device to:

display on the display a space including a first graphic object of a first entity corresponding to the external electronic device;

display, in association with the first graphic object, one or more first functions of the first entity;

receiving a first selection for one of the one or more first functions;

controlling the external electronic device to perform a function based on the first selection;

receive a voice input for changing the first graphic object to a second graphic object of a second entity different from the first entity in order to control the external electronic device via the second entity;

display, in association with the second graphic object, one or more second functions of the second entity, each of the second functions being mapped to a corresponding respective one of the first functions;

receiving a second selection of one of the second functions; and controlling the external electronic device to perform a function based on the first function mapped to the second function corresponding to the second selection.

2. The electronic device of claim 1, wherein instructions stored in the memory, when executed, cause at least one processor comprising processing circuitry to control the electronic device to:

obtain the second graphic object by applying an image generation model to an intermediate graphic object corresponding to the second entity based on text data converted from the received voice input.

3. The electronic device of claim 1, wherein instructions stored in the memory, when executed, cause at least one processor comprising processing circuitry to control the electronic device to:

obtain the second graphic object having a feature of a space surrounding a user, based on space information representing the feature, wherein the space information is based on a space image comprising the surrounding space of the user.

4. The electronic device of claim 1, wherein instructions stored in the memory, when executed, cause at least one processor comprising processing circuitry to control the electronic device to:

obtain the second graphic object having a visual feature mapped to a feature of a background sound of a space surrounding a user, based on background sound information representing the feature.

5. The electronic device of claim 1, wherein the second graphic object includes a feature requested by the received voice input.

6. The electronic device of claim 1, wherein instructions stored in the memory, when executed, cause at least one processor comprising processing circuitry to control the electronic device to:

based on receiving feedback input from the external electronic device, reproduce sound data about the second entity converted from the feedback input.

7. The electronic device of claim 1, wherein instructions stored in the memory, when executed, cause at least one processor comprising processing circuitry to control the electronic device to:

based on receiving feedback input from the external electronic device, display a graphic object including a feature of the second entity obtained by mapping to a state of the first entity in the received feedback input.

8. A method for controlling an external electronic device, the method comprising:

displaying on a display a space a first graphic object of a first entity corresponding to the external electronic device;

displaying, in association with the first graphic object, one or more first functions of the first entity;

receiving a first selection for one of the one or more first functions;

controlling the external electronic device to perform a function based on the first selection;

receiving a voice input for changing the first graphic object to a second graphic object of a second entity different from the first entity in order to control the external electronic device via the second entity;

displaying, in association with the second graphic object, one or more second functions of the second entity, each of the second function being mapped to a corresponding respective one of the first functions;

receiving a second selection of one of the second functions; and controlling the external electronic device to perform a function based on the first function mapped to the second function corresponding to the second selection.

9. The method of claim 8, further comprising:

applying an image generation model to an intermediate graphic object corresponding to the second entity based on text data converted from the received voice input to obtain the second graphic object.

10. The method of claim 8, further comprising:

identifying space information representing a feature of a surrounding space of a user; and obtaining the second graphic object having the feature of the surrounding space based on the space information, wherein the space information is based on a space image comprising the surrounding space.

11. The method of claim 8, further comprising:

identifying background sound information representing a feature of a background sound of a surrounding space of a user; and obtaining the second graphic object having a visual feature mapped to the feature of the background sound of the surrounding space, based on the background sound information.

12. The method of claim 8, wherein the second graphic object includes a feature requested by the received voice input.

13. The method of claim 8, further comprising:

based on receiving a feedback input from the external electronic device, reproducing sound data about the second entity converted from the feedback input.

14. The method of claim 8, further comprising:

based on receiving feedback input from the external electronic device, displaying a graphic object including a feature of the second entity obtained by mapping to a state of the first entity in the received feedback input.

15. A non-transitory computer-readable storage medium storing instructions which, when executed by at least one processor comprising processing circuitry of an electronic device for controlling an external electronic device, cause the electronic device to:

display on a display a space including a first graphic object of a first entity corresponding to the external electronic device;

display, in association with the first graphic object, one or more first functions of the first entity;

receive a first selection for one of the one or more first functions;

control the external electronic device to perform a function based on the first selection;

receive a voice input for changing the first graphic object to a second graphic object of a second entity different from the first entity in order to control the external electronic device via the second entity;

display, in association with the second graphic object, one or more second functions of the second entity, each of the second function being mapped to a corresponding respective one of the first functions;

receive a second selection of one of the second functions; and control the external electronic device to perform a function based on the first function mapped to the second function corresponding to the second selection.

* * * * *